(12) United States Patent
Hamamoto et al.

(10) Patent No.: US 7,675,914 B2
(45) Date of Patent: Mar. 9, 2010

(54) RELAY INFORMATION SETTING METHOD AND DEVICE

(75) Inventors: Moe Hamamoto, Osaka (JP); Takeshi Kokado, Kyoto (JP)

(73) Assignee: Panasonic Corporation, Osaka (JP)

( * ) Notice: Subject to any disclaimer, the term of this patent is extended or adjusted under 35 U.S.C. 154(b) by 492 days.

(21) Appl. No.: 11/632,060

(22) PCT Filed: Jul. 14, 2005

(86) PCT No.: PCT/JP2005/013086

§ 371 (c)(1),
(2), (4) Date: Jan. 10, 2007

(87) PCT Pub. No.: WO2006/006683

PCT Pub. Date: Jan. 19, 2006

(65) Prior Publication Data

US 2007/0189295 A1     Aug. 16, 2007

(30) Foreign Application Priority Data

Jul. 15, 2004  (JP) ............................. 2004-208563
Mar. 29, 2005  (JP) ............................. 2005-094253

(51) Int. Cl.
*H04L 12/56*  (2006.01)
*G06F 15/173*  (2006.01)

(52) U.S. Cl. .................. 370/392; 370/401; 709/225

(58) Field of Classification Search ............ None
See application file for complete search history.

(56) References Cited

U.S. PATENT DOCUMENTS 7,440,424 B2 *  10/2008  Nam et al. ............... 370/310

2005/0021603 A1  1/2005  Yokomitsu et al.

FOREIGN PATENT DOCUMENTS

JP    2005-151142    6/2005
WO   2004/066588    8/2004

OTHER PUBLICATIONS

Kaoru Oda, "Jissen! Kateinai server katsuyojyutsu, Kateinai LAN no kotiku kara server unyo madeno know-how wo tetteikaisetsu", PC Japan, vol. 9, No. 1, Soft bank Publishing Inc., Ltd., Jan. 1, 2004, pp. 116-121, along with partial English translation.

Matthew Schmitz, "WANIPConnections: 1 Service Template Version 1.01", [online], UPnP Forum, Nov. 12, 2001, [retrieved on Aug. 25, 2005], retrieved from the Internet: URL:http://www.upnp.org/standardizeddcps/igd.asp.

* cited by examiner

*Primary Examiner*—Pankaj Kumar
*Assistant Examiner*—Marcus R Smith
(74) *Attorney, Agent, or Firm*—Wenderoth, Lind & Ponack, L.L.P.

(57) ABSTRACT

The present invention improves the reliability and safety of communication in a communications system wherein communication is relayed. When an on-premise terminal 100 sets relay information, such as NAT information or the setting information of a packet filter, in a gateway 110, the relay information is set after confirming whether the NAT information for which a setting attempt is being made duplicates the NAT information of another on-premise terminal 101. The same applies to the case of deleting relay information. If the NAT information is duplicate, then interference with the communication of the other on-premise terminal 101 is prevented by modifying the relay information for which a setting attempt is being made, specifically the port number of the gateway 110 on a global network 001.

24 Claims, 17 Drawing Sheets

NAT Info. Setting (AddPortMapping) Parameters

| NewRemoteHost | IP address of communication other party on the global network 001 |
|---|---|
| NewExternalPort | Port number of the gateway 110 on the global network 001 |
| NewProtocol | Protocol (TCP/UDP) used in communication |
| NewInternalPort | Port number of on-premise terminal on the local network 002 |
| NewInternalClient | IP address of on-premise terminal on the local network 002 |
| NewEnabled | NAT entry is enabled/disabled (enabled: 1 / disabled: 0) |
| NewPortMappingDescription | Description of NAT entry |
| NewLeaseDuration | Expiration (in seconds) of NAT entry |

*Fig. 4A*

NAT Info. Setting (AddPortMapping) Response Status Code and Parameter (When Succeeded)

| Status Code | HTTP/1.1 200 OK |
|---|---|
| Parameter | None |

*Fig. 4B*

NAT Info. Setting Response Status Code and Parameter (When Failed)

| Status Code | HTTP/1.1 500 Internal Server Error |
|---|---|
| Parameter | Error code (For example, "714 NoSuchEntryInArray" and the like) |

*Fig. 4C*

Example of Actual NAT Info. Setting (AddPortMapping) Parameters

| NewRemoteHost | *(Arbitrary) |
|---|---|
| NewExternalPort | Port110 |
| NewProtocol | TCP |
| NewInternalPort | Port100 |
| NewInternalClient | IPL100 |
| NewEnabled | 1 |
| NewPortMappingDescription | 00F3-D068-430B-55A0_200404091658 |
| NewLeaseDuration | 3600 |

*Fig. 4D*

NAT Info. Confirmation (GetSpecificPortMappingEntry) Request Parameters

| NewRemoteHost | IP address of communication other party on the global network 001 |
|---|---|
| NewExternalPort | Port number of the gateway 110 on the global network 001 |
| NewProtocol | Protocol (TCP/UDP) used in communication |

*Fig. 5A*

Status Code and Parameters of NAT Info. Confirmation
(GetSpecificPortMappingEntry) Response (Case wherein the entry inquired about already exists)

| Status code | HTTP/1.1  200  OK |
|---|---|
| Parameters | Five parameters below |
| NewInternalPort | Port number of on-premise terminal on the local network 002 |
| NewInternalClient | IP address of on-premise terminal on the local network 002 |
| NewEnabled | NAT entry is enabled/disabled (enabled: 1 / disabled: 0) |
| NewPortMappingDescription | Description of NAT entry |
| NewLeaseDuration | Expiration (in seconds) of NAT entry |

*Fig. 5B*

Status Code and Parameter of NAT Info. Confirmation
(GetSpecificPortMappingEntry) Response (Case wherein the entry inquired about does not exist)

| Status code | HTTP/1.1  500  Internal Server Error |
|---|---|
| Parameter | Error code (For example, "714 NoSuchEntryInArray" and the like) |

*Fig. 5C*

Example of Actual NAT Info. Confirmation (GetSpecificPortMappingEntry) Request Parameters

| NewRemoteHost | *(Arbitrary) |
|---|---|
| NewExternalPort | Port110 |
| NewProtocol | TCP |

*Fig. 5D*

Example of Actual Status Code and Parameters of NAT Info. Confirmation (GetSpecificPortMappingEntry) Response

| Status code | HTTP/1.1 200 OK |
|---|---|
| Parameters | Five parameters below |
| NewInternalPort | Port100 |
| NewInternalClient | IPL100 |
| NewEnabled | 1 |
| NewPortMappingDescription | 00F3-D068-430B-55A0_200404091658 |
| NewLeaseDuration | 3600 |

*Fig. 5E*

NAT Info. Setting Confirmation Request Parameter

| Parameter | Port number of the gateway 110 on the global network 001 |

*Fig 7A*

Actual NAT Info. Setting Confirmation Request Parameter

| Parameter | Port110 |

*Fig 7B*

NAT Info. Deletion (DeletePortMapping) Parameters

| NewRemoteHost | IP address of communication other party on the global network 001 |
|---|---|
| NewExternalPort | Port number of the gateway 110 on the global network 001 |
| NewProtocol | Protocol (TCP/UDP) used in communication |

*Fig. 10A*

NAT Info. Deletion (DeletePortMapping) Response Status Code and Parameter (When Succeeded)

| Status Code | HTTP/1.1 200 OK |
|---|---|
| Parameter | None |

*Fig. 10B*

NAT Info. Deletion (DeletePortMapping) Response Status Code and Parameter (When Failed)

| Status Code | HTTP/1.1 500 Internal Server Error |
|---|---|
| Parameter | Error code (For example, "501 ActionFailed" and the like) |

*Fig. 10C*

Example of Actual NAT Info. Deletion (DeletePortMapping) Parameters

| NewRemoteHost | *(Arbitrary) |
|---|---|
| NewExternalPort | Port110 |
| NewProtocol | TCP |

*Fig. 10D*

NAT Info. Deletion Confirmation Request Parameter

| Parameter | Port number of the gateway 110 on the global network 001 |
|---|---|

*Fig 12A*

Actual NAT Info. Deletion Confirmation Request Parameter

| Parameter | Port110 |
|---|---|

*Fig 12B*

RELAY INFORMATION SETTING METHOD AND DEVICE

FIELD OF THE INVENTION

The present invention relates to a communications system wherein communication between different communication terminals is relayed by a relay device.

RELATED ART

In a local network environment, wherein communication terminals are connected to equipment such as routers, the use of some applications that need to communicate with a communication terminal that exists in an external network requires that the communication terminal set address translation (NAT: Network Address Translation) in the router. Conventionally, a presentation page provided by the router is accessed from the browser of the communication terminal, and the user directly sets the NAT. However, the setting of the NAT is very complicated for users who do not have sufficient knowledge of networks and routers.

As a method to solve such problems, a standard has been proposed that is called IGD (Internet Gateway Device), which is stipulated in the UPnP (Universal Plug and Play) protocol. UPnP is a software architecture that automatically connects devices in the home to one another and allows them to interoperate. It is possible to issue a request via the network to the router, on which the IGD function is implemented, to set the NAT. By implementing that function in the application, the NAT can be automatically set in the router when the application performs communication, which makes it no longer necessary for the user to set the NAT.

There are routers that, if a communication terminal requests a router that has an IGD function to set the NAT, will overwrite the NAT setting without returning an error, even if, for example, it duplicates a NAT setting previously set by another communication terminal. Consequently, there is a danger that a certain communication terminal will unfortunately overwrite the NAT settings that were set by another communication terminal. Conversely, there is also a danger that a certain communication terminal will have its own NAT setting overwritten by another communication terminal. If this occurs, then the communication terminal for which the NAT setting was overwritten will become communication disabled during communication, and it will be unable to conduct communication safely. In addition, even if the router has been set to filter packets, it is still possible that the setting of a certain communication terminal will be overwritten by another communication terminal. It is an object of the present invention to improve the reliability and safety of communication so that, if communication between a communication terminal on an external network and a communication terminal on a local network is relayed midway, the relay information that controls that relaying is protected.

DISCLOSURE OF THE INVENTION

To solve the abovementioned problems, a first aspect of the invention provides a relay information processing method wherein a first communication terminal sets and/or deletes first relay information, which is included in relay information stored by a relay device that connects a first network and a second network, and the first relay information relaying a packet transmitted from a second communication terminal on the second network to the first communication terminal on the first network. This method comprises:

a duplicate determining step wherein the first communication terminal acquires second relay information, which is already set in the relay device, prior to setting or deleting the first relay information in the relay device, and determines whether the relay information duplicates the first relay information;

a requesting step wherein the first communication terminal transmits a request to set or a request to delete the first relay information to the relay device only if it was determined that there is no duplication in the duplicate determining step; and a relay information updating step wherein the relay device stores the first relay information or deletes the first relay information from the relay information in accordance with the setting request or the deletion request.

Thereby, it is possible to prevent the overwriting or deletion of the relay information of another communication terminal, as well as to enhance the overall safety and reliability of communication.

A second aspect of the invention provides a relay information processing method as recited in the first aspect, wherein the relay information comprises: a first parameter that includes at least port number information possessed by the relay device on the second network; a second parameter that is the address of a communication terminal on the first network; and a third parameter that includes port number information of the communication terminal on the first network. This method further comprises a transferring step wherein the relay device transfers data that arrives at a port specified by the first parameter to a port specified by the third parameter from amongst the ports possessed by the communication terminal specified by the second parameter.

By using so-called NAT information and packet filtering information as relay information, it is possible to safely set and delete NAT information set in the relay device, which connects a global network, such as the Internet, and a local network, such as a LAN. In addition, by using information for packet filtering as relay information, it is possible to safely set and delete packet filtering information set in the relay device. As a result, the safety and reliability of the communication of the communication terminal on the local network can be enhanced.

A third aspect of the invention provides a relay information processing method as recited in the second aspect, wherein the duplicate determining step comprises:

a step wherein the first communication terminal transmits a duplicate confirmation request to the relay device; and a step wherein the relay device transmits a duplicate confirmation response, which includes the second relay information, to the first communication terminal in response to the duplicate confirmation request.

Here, the duplicate confirmation request comprises any port number that specifies a port possessed by the relay device on the second network. In addition, the duplicate confirmation response comprises the second relay information for the port number specified by the duplicate confirmation request.

A fourth aspect of the invention provides a relay information processing method as recited in the third aspect, wherein the duplicate determining step further comprises a step wherein the first communication terminal compares the second parameter included in the second relay information in the duplicate confirmation response received from the relay device with the second parameter included in the first relay information, and, if both do not match, determines that the first relay information and the second relay information are duplicates.

A fifth aspect of the invention provides a relay information processing method as recited in the third aspect, wherein the relay information further comprises an identifier as a parameter that uniquely specifies the first communication terminal. In the requesting step of this method, the first communication terminal transmits a request to set the relay information to the relay device. In addition, the duplicate determining step further comprises a step wherein the first communication terminal compares the identifier included in the second relay information in the duplicate confirmation response received from the relay device with the identifier included in the first relay information, and, if both do not match, determines that the first relay information and the second relay information are duplicates.

A sixth aspect of the invention provides a relay information processing method as recited in the fifth aspect, wherein the duplicate determining step further comprises the following steps are executed by the first communication terminal:
- an identifier comparing step that compares the identifier included in the second relay information with the identifier included in the first relay information;
- a first determining step that determines that the first relay information and the second relay information are not duplicates if both identifiers match in the identifier comparing step;
- a parameter comparing step that further compares the second parameter included in the first relay information with the second parameter included in the second relay information if both identifiers did not match in the identifier comparing step;
- a second determining step that determines that the first relay information and the second relay information are not duplicates if both second parameters matched in the parameter comparing step; and
- a third determining step that determines that the first relay information and the second relay information are duplicates if both second parameters did not match in the parameter comparing step.

A seventh aspect of the invention provides a relay information processing method as recited in the first aspect, further comprising a resetting step wherein, if it was determined in the duplicate determining step that the first relay information and the second relay information are duplicates, then the first communication terminal modifies the first relay information to third relay information. In this method, the duplicate determining step, the requesting step, and the relay information updating step are executed for the third relay information.

If the first relay information for which a setting attempt is being made duplicates the relay information of another communication terminal, then an attempt is made to modify the relay device to the third relay information. Thereby, it is possible to set the relay information in a range wherein the relay information of one communication terminal is not overwritten by that of another.

An eighth aspect of the invention provides a relay information processing method as recited in the first aspect, further comprising a connection confirming step wherein, if it was determined in the duplicate determining step that the first relay information and the second relay information are duplicates, then the first communication terminal confirms whether another communication terminal, for which the first relay information is set, is connected to the first network. In this method, if it was confirmed in the connection confirming step that the other communication terminal is not connected, then, in the requesting step, the first communication device transmits a request to set or a request to delete the first relay information to the relay device.

If first relay information for which a setting attempt is being made duplicates the relay information of another communication terminal, then, the first relay information is set by overwriting, as is, if the other communication terminal is not connected to the first network. This is because it will not interfere with the communication of the other communication terminal. Conversely, if first relay information for which a deletion attempt is being made duplicates the relay information of another communication terminal, then the first relay information is deleted, as is, if the other communication terminal is not connected to the first network. Similarly, this is because it will not interfere with the communication of the other communication terminal.

A ninth aspect of the invention provides a relay information processing method as recited in the eighth aspect, wherein in the requesting step, prior to transmitting a request to set the first relay information, the first communication device transmits to the relay device a request to delete the second relay information that duplicates the first relay information.

If an attempt is being made to set first relay information and duplicate relay information is found, then that relay information is deleted, and the first relay information is then registered. This is to prevent the concurrent existence of both, and to prevent a misoperation in the relaying of data, thereby enhancing the safety and reliability of communication. In addition, if an attempt is being made to delete first relay information and duplicate relay information is found, then that relay information is not being used, so it is deleted. This is because it doesn't interfere with the communication of the other communication terminal.

A tenth aspect of the invention provides a relay information processing method as recited in the eighth aspect, further comprising a resetting step wherein, if it was confirmed in the connection confirming step that another communication terminal is connected, then the first communication terminal modifies the first relay information to third relay information. In this method, the duplicate determining step, the connection confirming step, the requesting step, and the relay information updating step are executed for the third relay information.

If relay information that duplicates first relay information for which a setting attempt is being made is in use by another communication terminal, then an attempt is made to once again set the relay information with third relay information that does not duplicate that relay information. Thereby, relay information can be set without interfering with other communication actually in progress.

An eleventh aspect of the invention provides a relay information processing method as recited in the first aspect, wherein the duplicate determining step further comprises:
- a test data transmitting step wherein the communication terminal on the second network transmits to the relay device test data destined for the first communication terminal;
- a test data determining step wherein the first communication terminal determines whether the test data has arrived at the first communication terminal; and
- a duplicate presence determining step wherein the first communication terminal determines, based on the determination result in the test data determining step, the presence of the second relay information that duplicates the first relay information.

If data that the first communication terminal had sent from an external communication terminal arrives at the first communication terminal, then it can be determined that there is no duplicative relay information. Conversely, if no data arrives, then it can be determined that there is duplicate relay information. Because the presence of duplicate data is confirmed based on the results of actually performing data communication, it is advantageous in that the reliability of that determination result is high.

A twelfth aspect of the invention provides a relay information processing method as recited in the first aspect, wherein the requesting step further comprises a storing step wherein, if the first communication terminal has transmitted a request to set the first relay information, then the first communication terminal stores the first relay information until transmitting a request to delete the first relay information.

By storing the set relay information until deleting such, the first communication terminal can easily determine whether relay information for which a setting attempt is being made is already set in the relay device.

A thirteenth aspect of the invention provides a relay information processing method as recited in the twelfth aspect, wherein the duplicate determining step further comprises a step wherein the first communication terminal further determines whether the relay device is storing relay information that duplicates the first relay information stored in the storing step.

If previously set first relay information remains in the relay device, the first communication terminal can perform communication by reusing that first relay information, as is.

A fourteenth aspect of the invention provides a relay information processing method as recited in the thirteenth aspect, wherein the duplicate determining step further comprises a step wherein, if it is determined that the relay device is storing relay information that duplicates the first relay information, then the first communication terminal further determines whether that relay information is set for the first communication terminal.

If there is relay information that is set for the first communication terminal, then the first communication terminal can reuse that relay information, as is. For example, if a port number is included in the relay information, then it is possible to prevent wasting of ports by reusing the relay information.

A fifteenth aspect of the invention provides a relay information processing method as recited in the first aspect, further comprising a relay inquiring step wherein, prior to the requesting step, the first communication terminal inquires with the relay device as to whether it is possible to set or delete the relay information in the relay device. In the requesting step, the first communication terminal transmits the setting request or the deletion request to the relay device based on the response about whether the relay inquiry is possible.

By inquiring in advance whether it is possible to set or delete relay information in the relay device, it is possible to prevent wasteful processing on the communication terminal side.

A sixteenth aspect of the invention provides a relay information processing method that is executed by a relay device, which connects a first network and a second network, a first communication terminal on the first network, and a second communication terminal on the second network. This method comprises:

a setting step wherein the first communication terminal sets, in said relay device, first relay information for relaying data transmitted from the second communication terminal to the first communication terminal;

a test data transmitting step wherein, after the setting step, the second communication terminal transmits test data destined for the first communication terminal to the relay device;

a test data determining step wherein the first communication terminal determines whether the test data has arrived at the first communication terminal; and a setting determining step wherein the first communication terminal determines, based on the determination result in the test data determining step, whether the first relay information is validly set in the relay device.

By actually confirming, after setting relay information, whether data is relayed in accordance with that relay information, it is possible to enhance the safety and reliability in the relaying of communication.

A seventeenth aspect of the invention provides a relay information processing method as recited in the sixteenth aspect, further comprising a deletion requesting step wherein, if it was determined in the setting determining step that the first relay information is not validly set in the relay device, then the first communication terminal requests the relay device to delete the first relay information.

If data is not relayed in accordance with relay information that is assumed to have been set, then the port of the relay device can be effectively utilized by deleting the set relay information.

An eighteenth aspect of the invention provides a relay information processing method as recited in the sixteenth aspect, further comprising a resetting step wherein, if it was determined in the setting determining step that the first relay information is not validly set in the relay device, then the first communication terminal sets the first relay information, or third relay information different therefrom, in the relay device.

By setting the relay information once again to other relay information, it is possible to prevent the situation wherein communication cannot be relayed, and to ensure the reliability of communication.

A nineteenth aspect of the invention provides a relay information processing method as recited in the sixteenth aspect, further comprising a controlling step that periodically repeats the test data transmitting step, the test data determining step, and the setting determining step.

By periodically confirming, after first relay information has been set, the validity of the setting, it is possible to rapidly detect the fact that a setting has become invalid. If a setting has become invalid, communication can be resumed by once again setting the relay information to the same relay information or to different relay information, thereby enhancing the safety and reliability of communication.

A twentieth aspect of the invention provides a relay information processing method that is executed by a relay device, which connects a first network and a second network, a first communication terminal on the first network, and a second communication terminal on the second network. This method comprises:

a storing step wherein the relay device stores first relay information for relaying data transmitted from the second communication terminal to the first communication terminal;

a deleting step wherein the first communication terminal requests the relay device to delete the first relay information;

a test data transmitting step wherein, after the deleting step, the second communication terminal transmits test data destined for the first communication terminal to the relay device;

a test data determining step wherein the first communication terminal determines whether the test data has arrived at the first communication terminal; and a deletion success determining step wherein the first communication terminal determines whether the first relay information is deleted from the relay device based on the determination result in the test data determining step.

By confirming, after relay information has been deleted, the success of that deletion by actually confirming whether data is no longer being relayed, it is possible to enhance the safety and reliability of the relaying of communication.

A twenty-first aspect of the invention provides a relay information processing method executed by a first communication terminal on a first network, a second communication terminal on a second network, and a relay device that connects the first network and the second network and that relays communication between the first and second networks based on relay information. This method comprises:

- a setting step wherein the first communication terminal sets, in said relay device, first relay information for relaying data transmitted from the second communication terminal to the first communication terminal;
- a setting confirming step wherein the first communication terminal inquires with the relay device about the presence of the setting of the first relay information;
- a setting determining step wherein the first communication terminal determines, based on a response from the relay device to the inquiry, whether the first relay information is set in the relay device; and
- a controlling step that periodically repeats the setting confirming step and the setting determining step.

By periodically confirming, after first relay information has been set, the validity of that setting, it is possible to rapidly detect the fact that a setting has become invalid. If a setting has become invalid, communication can be resumed by once again setting the relay information to the same relay information or different relay information, thereby enhancing the safety and reliability of communication.

A twenty-second aspect of the invention provides a relay information processing method as recited in the twenty-first aspect, wherein the relay information comprises a first parameter that comprises the port number possessed by the relay device on the second network, a second parameter that is the address of a communication terminal on the first network, and a third parameter that is the port number of a communication terminal on the first network. This method further comprises a transferring step wherein the relay device transfers data that arrives at a port specified by the port number of the relay device to a port specified by the third parameter from amongst the ports possessed by the communication terminal specified by the second parameter.

A twenty-third aspect of the invention provides a relay information processing method as recited in the twenty-first aspect, wherein the setting determining step comprises:

- a step wherein a duplicate confirmation request is transmitted from the first communication terminal to the relay device; and
- a step wherein a duplicate confirmation response is transmitted from the relay device to the first communication terminal in response to the duplicate confirmation request.

In this method, the duplicate confirmation request comprises any port number that specifies a port possessed by the relay device on the second network. In addition, the duplicate confirmation response comprises the second relay information for the port number specified by the duplicate confirmation request.

A twenty-fourth aspect of the invention provides a relay information processing method as recited in the twenty-third aspect, wherein, in the setting determining step, the first communication terminal compares the second parameter included in the second relay information in the duplicate confirmation response received from the relay device with the second parameter included in the first relay information, and, if both do not match, determines that the first relay information and the second relay information are duplicates.

A twenty-fifth aspect of the invention provides a relay information processing method as recited in the twenty-third aspect, wherein the relay information further comprises an identifier as a parameter that uniquely specifies the first communication terminal. In this method, the requesting step transmits a request to set the relay information that includes the identifier, which uniquely specifies the first communication terminal, to the relay device. In addition, the setting determining step further comprises a step wherein the first communication terminal compares the identifier included in the second relay information in the duplicate confirmation response received from the relay device with the identifier included in the first relay information, and, if both do not match, determines that the first relay information and the second relay information are duplicates.

A twenty-sixth aspect of the invention provides a relay information processing method as recited in the twenty-fifth aspect, wherein the setting determining step further comprises the following steps executed by the first communication terminal:

- an identifier comparing step that compares the identifier included in the second relay information with the identifier included in the first relay information;
- a first determining step that, if both identifiers match in the identifier comparing step, determines that the first relay information and the second relay information are not duplicates;
- a parameter comparing step that, if both identifiers did not match in the identifier comparing step, further compares the second parameter included in the first relay information with the second parameter included in the second relay information;
- a second determining step that, if both second parameters matched in the parameter comparing step, determines that the first relay information and the second relay information are not duplicates; and
- a third determining step that, if both second parameters did not match in the parameter comparing step, determines that the first relay information and the second relay information are duplicates.

A twenty-seventh aspect of the invention provides a communication device that sets and/or deletes, in a relay device that connects a first network and a second network, first relay information included in relay information stored by the relay device, the first relay information relaying a packet transmitted from a second communication device on the second network to the first communication device on the first network. This device comprises the following unit:

- a duplicate determining unit that acquires second relay information, which is already set in the relay device, prior to setting or deleting the first relay information in the relay device, and determines whether the relay information duplicates the first relay information; and
- a requesting unit that transmits a request to set or a request to delete the first relay information to the relay device only if it was determined that there is no duplication by the duplicate determining unit.

A twenty-eighth aspect of the invention provides a communication device as recited in the twenty-seventh aspect, wherein the relay information comprises a first parameter that includes at least port number information possessed by the relay device on the second network; a second parameter that includes the address information of a communication device on the first network; and a third parameter that includes the port number of the communication device on the first network.

A twenty-ninth aspect of the invention provides a communication device as recited in the twenty-eighth aspect, wherein the duplicate determining unit comprises a unit for transmitting a duplicate confirmation request to the relay device; and a unit for receiving from the communication device a duplicate confirmation response, which includes the second relay information, in response to the duplicate confirmation request. Here, the duplicate confirmation request comprises any port number that specifies a port possessed by the relay device on the second network. In addition, the duplicate confirmation response comprises the second relay information for the port number specified by the duplicate confirmation request.

A thirtieth aspect of the invention provides a communication device as recited in the twenty-ninth aspect, wherein the duplicate determining unit further comprises a unit that compares the second parameter included in the second relay information in the duplicate confirmation response received from the relay device with the second parameter included in the first relay information, and, if both do not match, determines that the first relay information and the second relay information are duplicates.

A thirty-first aspect of the invention provides a communication device as recited in the twenty-ninth aspect, wherein the relay information further comprises an identifier as a parameter that specifies the first communication terminal. In this device, the requesting unit transmits a request to transmit the relay information that includes the identifier, which specifies the first communication terminal, to the relay device. In addition, the duplicate determining unit further comprises a unit that compares the identifier included in the second relay information in the duplicate confirmation response received from the relay device with the identifier included in the first relay information, and, if both do not match, determines that the first relay information and the second relay information are duplicates.

A thirty-second aspect of the invention provides a communication device as recited in the thirty-first aspect, wherein the duplicate determining unit further comprises the following unit:

an identifier comparing unit that compares the identifier included in the second relay information with the identifier included in the first relay information;

a first determining unit that, if the identifier comparing unit determined that both identifiers match, determines that the first relay information and the second relay information are not duplicates;

a parameter comparing unit that, if the identifier comparing unit determined that both identifiers do not match, further compares the second parameter included in the first relay information with the second parameter included in the second relay information;

a second determining unit that, if the parameter comparing unit determined that both second parameters match, determines that the first relay information and the second relay information are not duplicates; and a third determining unit that, if the parameter comparing unit determined that both second parameters do not match, determines that the first relay information and the second relay information are duplicates.

The relay information setting method of the present invention makes it possible to improve the safety and reliability of communication between an external network and a local network.

BRIEF DESCRIPTION OF DRAWINGS

FIG. 4 depicts:
(a) one example of the NAT information setting parameters (AddPortMapping);
(b) one example of a response parameter for the case wherein the NAT information exists; (c) one example of a response parameter for the case wherein the NAT information does not exist; and
(d) a concrete example of the NAT information setting parameters.

FIG. 5 depicts:
(a) one example of NAT information confirmation request parameters (GetSpecificPortMappingEntry);
(b) one example of response parameters for the case in which the NAT information exists;
(c) one example of a response parameter for the case wherein the NAT information does not exist;
(d) a concrete example of the NAT information confirmation request parameters; and
(e) a concrete example of response parameters for the case wherein the NAT information exists.

FIG. 7 depicts:
(a) one example of a NAT information duplicate confirmation request parameter; and
(b) a concrete example of the NAT information duplicate confirmation request parameter.

FIG. 10 depicts:
(a) one example of NAT information deletion parameters;
(b) NAT information deletion response parameter (when succeeded);
(c) NAT information deletion response parameter (when failed); and
(d) a concrete example of NAT information deletion parameters.

FIG. 12 depicts:
(a) one example of a NAT information deletion confirmation request parameter; and
(b) a concrete example of the NAT information deletion confirmation request parameter.

PREFERRED EMBODIMENTS

First Embodiment

Constitution (1) Overall Constitution

Figure 1:
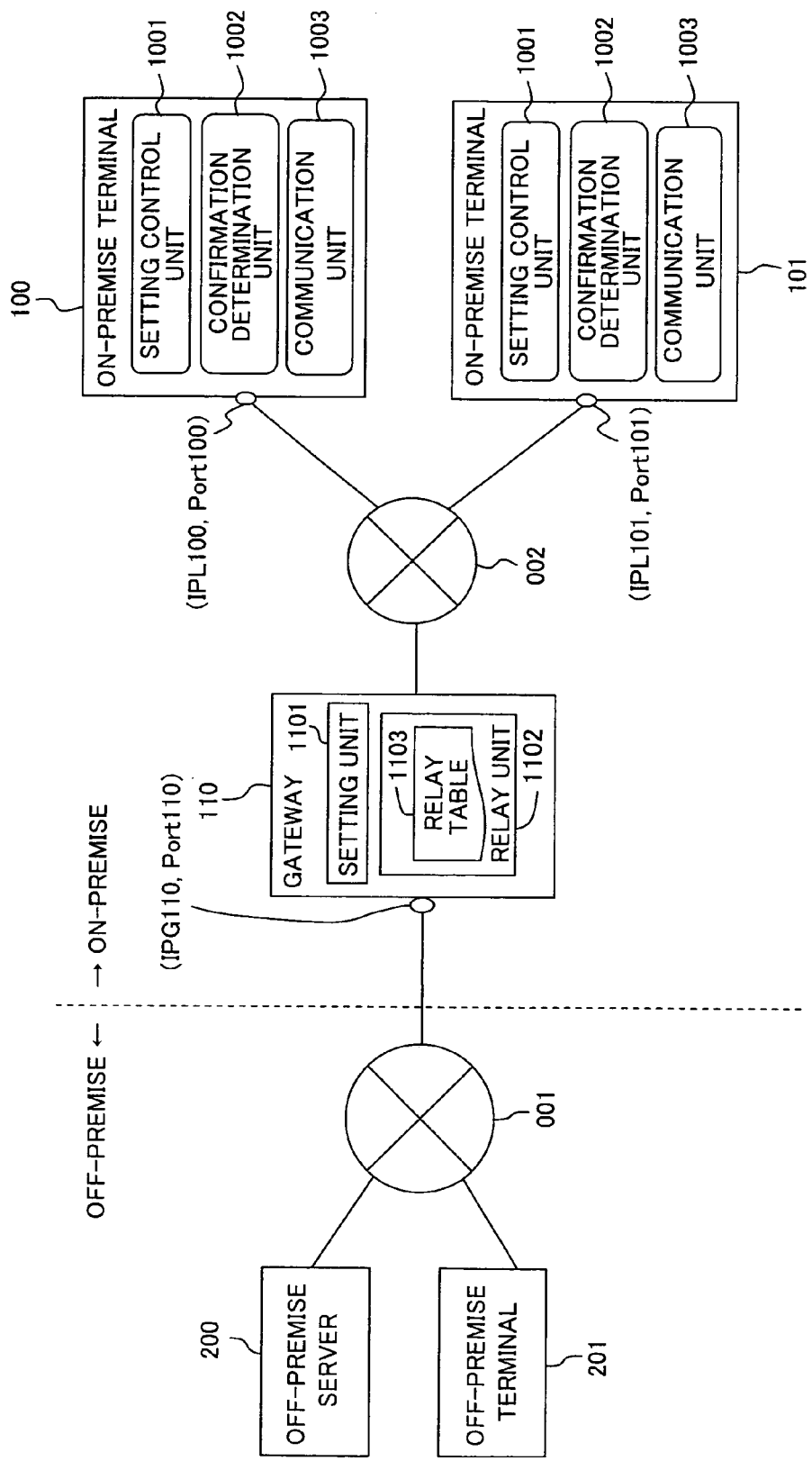
FIG. 1 is an overall block diagram of a communication relay system according to the first embodiment of the present invention.

FIG. 1 depicts the overall constitution of a communication relay system according to the first embodiment of the present invention.

With the communication relay system in FIG. 1, a global network 001 and a local network 002 are connected by a gateway 110. The gateway 110 has a global IP address (hereinbelow, may be simply referred to as IPG) 110. An off-premise server 200 and an off-premise terminal 201 are connected to the global network 001. A plurality of on-premise terminals 100, 101 are connected to the local network 002. The on-premise terminal 100 has a local IP address (hereinbelow, may be simply referred to as IPL) 100, and the on-premise terminal 101 has a local IP address IPL 101. The on-premise terminals 100, 101 can communicate with the off-premise server 200, the off-premise terminal 201, and the like via the gateway 110.

(2) Gateway

The gateway 110 comprises a setting unit 1101 and a relay unit 1102.

The setting unit 1101 sets relay information in the relay unit 1102. More specifically, if the setting unit 1101 can have an IGD function in the UPnP protocol and receives a request to set relay information from an arbitrary on-premise terminal, then the relay unit 1102 is requested to set the relay information.

The relay unit 1102 has a NAT function. Namely, the relay unit 1102 performs address translation from global IP addresses to local IP addresses, port number translation, and the like. In addition, the relay unit 1102 may also have a packet filtering (PF) function that passes and discards packets by referencing the header of each packet. The relay unit 1102 executes the NAT function and the PF function based on the relay information. The relay information is stored in a relay table 1103.

Figure 2:
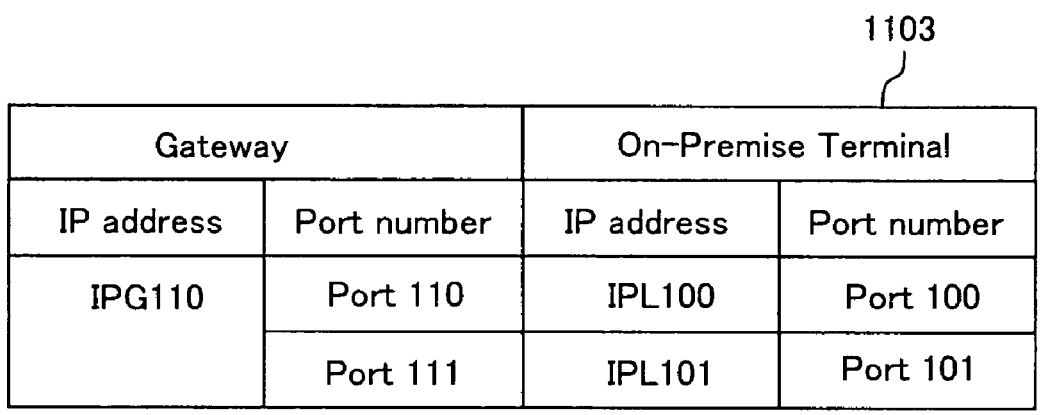
FIG. 2 is a conceptual explanatory diagram of the relay information stored in a relay table.

FIG. 2 is a conceptual explanatory diagram of the relay information stored in the relay table 1103. This example shows relay information for executing the NAT function. For example, the relay information is set so that a packet that arrives at the port number "Port110" of the global IP address "IPG110" is transmitted to the on-premise terminal port number "Port100" of the local IP address "IPL100." In addition, the relay information is set so that a packet that arrives at the port number "Port111" of the global IP address "IPG110" is transmitted to the on-premise terminal port number "Port101" of the local IP address "IPL101."

The gateway 110 that has the functions discussed above comprises a computer terminal, which has, for example, a CPU, ROM, and RAM.

(3) On-Premise Terminal

The on-premise terminals 100, 101 both have the same functions, and therefore the functions of the on-premise terminal 100 will be explained here.

The on-premise terminal 100 comprises a setting control unit 1001, a confirmation determination unit 1002, and a communication unit 1003.

The setting control unit 1001 requests the gateway 110 to set and delete relay information. In addition, the setting control unit 1001 may perform a process (a setting success confirming process, which is discussed below) to confirm whether the relay information was actually set in the gateway 110. Furthermore, the setting control unit 1001 may perform a process (a setting periodic confirming process, which is discussed later) that periodically confirms whether the relay information is set in the gateway 110. In addition, the setting control unit 1001 can also perform a process (a deletion confirming process, which is discussed later) to confirm whether the relay information has been actually deleted from the gateway 110.

Before transmitting a request to set relay information to the gateway 110, the confirmation determination unit 1002 determines whether the relay information it is attempting to set duplicates the relay information set by another on-premise terminal. In addition, before transmitting a request to delete relay information to the gateway 110, the confirmation determination unit 1002 performs a confirming process so that relay information that was set by another terminal is not deleted.

The communication unit 1003 transmits and receives, via the gateway 110, data to and from the off-premise server 200, the off-premise terminal 201, and the like on the global network 001. For example, if the on-premise terminal 100 is an IP telephone, a communication process compliant with VoIP is performed. The on-premise terminals 100, 101, which have the functions discussed above, are implemented by computer terminals, which have a CPU, ROM, RAM, and the like. Concrete examples of on-premise terminals 100, 101 that can be cited include IP telephones, personal computers, mobile telephones, PDAs (Personal Digital Assistants), on-vehicle navigation systems, and multimedia data receiving and playback devices.

Flow of Processing

The following is a concrete explanation of the flow of processing performed by the communication relay system. The explanation below takes as an example a case wherein the relay information is NAT information, but the setting and deletion of packet filtering information can be performed similarly. In addition, the on-premise terminals 100, 101 both have the same functions, and the following explanation therefore takes as an example a case wherein the on-premise terminal 100 sets and deletes relay information.

The communication relay system is broadly divided into: (1) a duplicate setting preventing process, (2) the setting success confirming process, (3) the setting periodic confirming process, (4) a setting deleting process, and (5) the deletion confirming process. Each of these processes is sequentially explained below, referencing the drawings. To facilitate the explanation, the IP address of the on-premise terminal 100 on the local network 002 shall be "IPL100" and the port number desired for use shall be "Port100." In addition, the IP address and the port number of the gateway 110 on the global network 001 that the on-premise terminal 100 would like to use shall be "IPG110" and "Port110."

(1) Duplicate Setting Preventing Process

Figure 3:
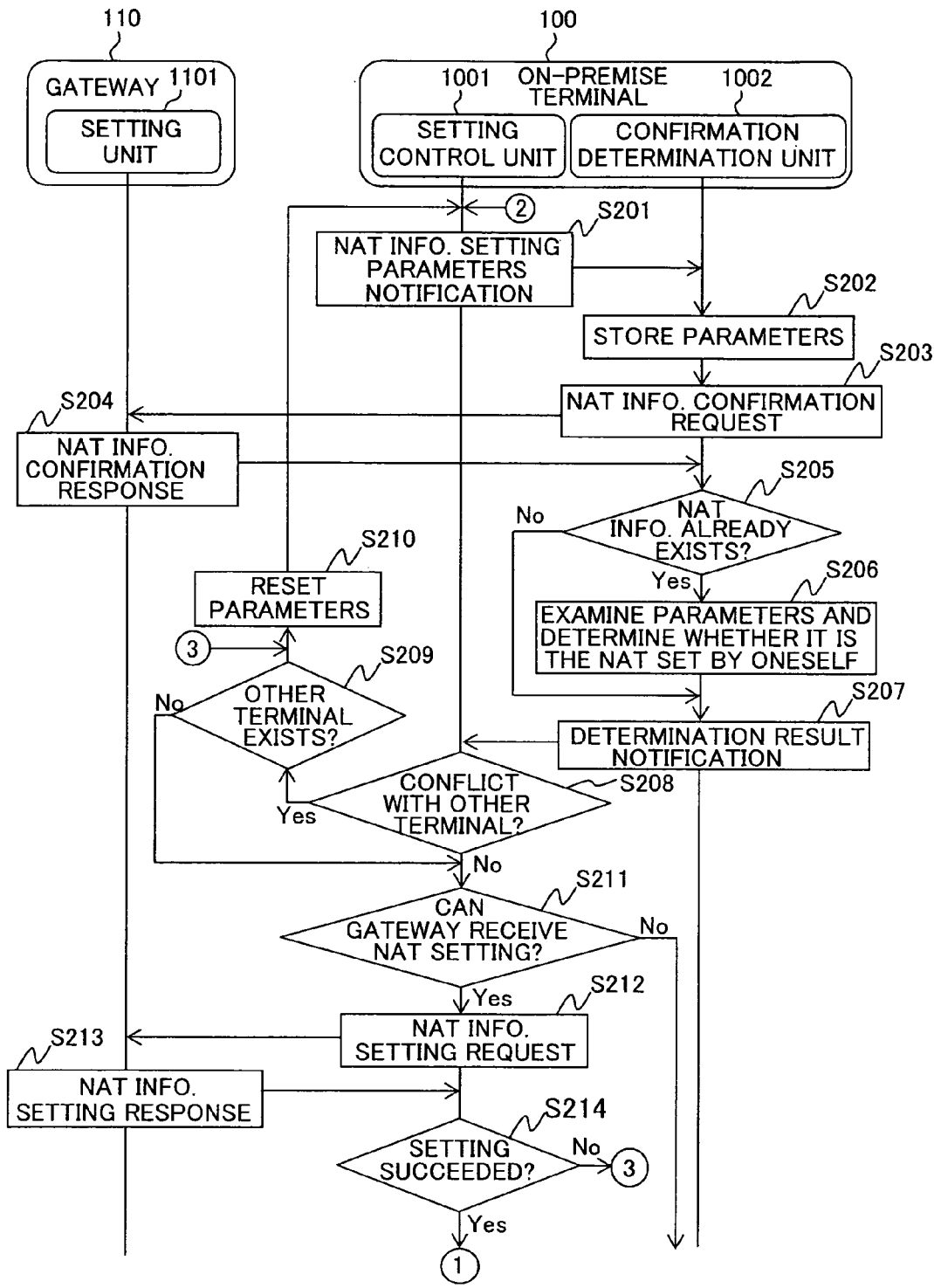
FIG. 3 is an explanatory diagram that depicts one example of the flow of a duplicate setting preventing process.

FIG. 3 is an explanatory diagram that depicts one example of the flow of the duplicate setting preventing process. This process can be broadly divided into three parts: (1-1) duplication confirmation, (1-2) NAT information modification, and (1-3) NAT information setting. Before the gateway 110 is requested to set NAT information, these processes confirm whether the NAT information about to be set duplicates that of another on-premise terminal within the local network 002. Thereby, it is possible to prevent overwriting the NAT information of another on-premise terminal and, as a result, to prevent interfering with the communication of another on-premise terminal 101.

(1-1) Duplication Confirmation

First, steps S201-S207 examine whether the NAT information to be set duplicates already set NAT information.

STEP S201: The setting control unit 1001 of the on-premise terminal 100 notifies the confirmation determination unit 1002 of the parameters needed to request the setting of NAT information. The NAT information setting parameters include at least the following three parameters:

(i) The port number "Port110" of the gateway 110 on the global network 001

(ii) The IP address "IPL100" of the on-premise terminal 100 on the local network 002

(iii) The port number "Port100" of the on-premise terminal 100 on the local network 002

FIG. 4(*a*) lists the NAT information setting parameters that should be specified for the case of using "AddPortMapping" stipulated by the IGD as the API (Application Program Interface) of the NAT setting request. FIG. 4(*d*) depicts a concrete example of the NAT information setting parameters for AddPortMapping in the present embodiment. If NAT information is set by the AddPortMapping request in FIG. 4(*d*), then the following type of relaying is performed: "A TCP packet that arrives at 'Port110' of the gateway 110 from an arbitrary terminal on the global network 001 is relayed to 'Port100' of the on-premise terminal that has 'IPL100' on the local network 002."

STEP S202: The confirmation determination unit 1002 stores the NAT information setting parameters, for which a notification was sent, in a storage unit (not shown).

STEP S203: Next, the confirmation determination unit 1002 transmits a NAT information confirmation request to the setting unit 1101 of the gateway 110. The NAT information confirmation request includes at least the port number "Port110" of the gateway 110 included in the parameters for which a notification was sent from the setting control unit 1001. This request makes it possible to inquire with the gateway 110 whether the NAT information corresponding to that port number "Port110" is already set.

FIG. 5(*a*) lists the NAT information confirmation request parameters for the case of using a "GetSpecificPortMappingEntry" action, which is stipulated by the IGD, as one example of an API for a NAT information confirmation request. In addition, FIG. 5(*d*) is a concrete example of the request parameters that should be specified by "GetSpecificPortMappingEntry" in the present embodiment. This concrete example is a request that inquires about the following: "Presence of a rule for relaying a TCP packet, which arrives at a port number 'Port110' of the gateway 110, from an arbitrary terminal on the global network 001 to an on-premise terminal on the local network 002."

STEP S204: The setting unit 1101 of the gateway 110 references the relay table 1103, and searches for NAT information corresponding to the parameter "Port110" included in the received NAT information confirmation request. If NAT information corresponding to "Port110" already exists, then a NAT information confirmation response that includes that NAT information is transmitted to the on-premise terminal 100. If NAT information corresponding to "Port110" does not exist, then a response to that effect is transmitted to the on-premise terminal 100.

FIG. 5(*b*) lists the response parameters for the case in which NAT information exists with respect to a "GetSpecificPortMappingEntry" inquiry. FIG. 5(*c*) lists the response parameter for the case wherein NAT information does not exist. FIG. 5(*e*) is a concrete example of FIG. 5(*b*). This response indicates the following: "NAT information exists that relays packets to the port number 'Port100' of an on-premise terminal that has the IP address 'IPL100' on the local network 002."

STEP S205: When a NAT information confirmation response is received from the gateway 110, the confirmation determination unit 1002 confirms the content of that response. Namely, the confirmation determination unit 1002 determines whether NAT information corresponding to the port number "Port100" that was inquired about exists. With reference to the example in FIG. 5, the confirmation determination unit 1002 determines whether the status code of the response is "HTTP/1.1 200 OK" (FIG. 5(*b*)) or "HTTP/1.1 500 Internal Server Error" (FIG. 5(*c*)).

STEPS S206-S207: If NAT information corresponding to the port number "Port100" that was inquired about exists, then the confirmation determination unit 1002 compares the parameter included in that response with the NAT information setting parameters stored in step S202. Furthermore, based on those comparison results, the confirmation determination unit 1002 determines whether that NAT information is the NAT information set by oneself or whether it duplicates NAT information for another on-premise terminal (S206), and notifies the setting control unit 1001 of the determination results (S207). This determination is made based on the "(ii) IP address of on-premise terminal 100 on local network 002" in, for example, the NAT information setting parameters, as well as on the IP address of the on-premise terminal in the response. If both match, then it is determined that the NAT information is the NAT information set by oneself; if they do not match, then it is determined that the NAT information duplicates the NAT information set for another on-premise terminal. If a NAT information confirmation request is transmitted by a "GetSpecificPortMappingEntry" action, then a determination is made that the NAT information is the NAT information set by oneself if the value "IPL100" of the IP address of the on-premise terminal 100 matches the value (IPL 100 in the figure) of "NewInternalClient" in the NAT information confirmation response shown in FIG. 5(*e*).

(1-2) Modification of NAT Information

In steps S208-S210, the on-premise terminal 100 modifies the NAT information setting parameters in accordance with the results of the NAT information duplication determination.

STEP S208: If the determination result received is "one's own NAT information," then the setting control unit 1001 transitions to step S211, which is discussed later. Namely, the setting control unit 1001 transitions to a process that requests the gateway 110 to set NAT information. Conversely, if the determination result is "NAT information of another on-premise terminal," then the setting control unit 1001 transitions to step S209.

STEP S209: The setting control unit 1001 determines whether another on-premise terminal exists. Here, "exists" means that another on-premise terminal is connected to the local network 002, i.e., that it is online. The setting control unit 1001 can make this determination by using, for example, ICMP or ARP. If another on-premise terminal exists, then the setting control unit 1001 determines that it is necessary to modify the NAT information setting parameters, and transitions to step S210. Conversely, if another on-premise terminal does not exist, then the setting control unit 1001 sets the NAT information by overwriting, and transitions to step S211. Furthermore, after the NAT information of another on-premise terminal is deleted, it is acceptable to once again set one's own NAT information.

STEP S210: The setting control unit 1001 modifies the port number "Port110" of the gateway 110 in the NAT information setting parameters to another port number, and resets the parameters. Subsequently, the method returns to step S201 and repetitively performs the process discussed above.

(1-3) Setting of NAT Information

In steps S211-S213, the on-premise terminal 100 sets NAT information in the gateway 110.

STEP S211: The on-premise terminal 100 determines whether the gateway 110 can accept the setting of NAT information. If yes, then the method transitions to step S212 in order to set the NAT information. If no, then another process is performed. For example, the method transitions to a process (not shown) wherein the communication unit 1003 executes communication. The reason for executing this step is as follows. For example, there are cases wherein, depending on the installation mode of the gateway 110, an IP address cannot be allocated to a gateway 110 on the global network. In this case, NAT information cannot be set in the gateway 110. Consequently, it is preferable to inquire about the global IP address of the gateway 110 by using, for example, the API "GetExternalIPAddress," which is stipulated by the IGD standard. Based on the response thereto, the on-premise terminal 100 can confirm the status of the allocation of a global IP address.

STEP S212: The setting control unit 1001 transmits a NAT information setting request to the setting unit 1101 of the gateway 110. This request includes the NAT information setting parameters (refer to FIGS. 4(*a*) and (*d*)), which were confirmed in steps S201-S204. Namely, if the NAT information stored in step S202 does not duplicate the setting of an already existing other on-premise terminal, or if it is already existing NAT information of one's own, then the stored NAT information is set in the gateway 110. Furthermore, if NAT information already exists that is the same as that set by oneself, then a NAT setting request is not newly issued and that setting may be reused.

STEP S213: The setting unit 1101 of the gateway 110 transmits a NAT information setting response, which includes information as to whether or not the setting of the NAT information succeeded, to the on-premise terminal 100. FIGS. 4(*b*) and (*c*) each list the status code and the parameter when there was a success and when there was a failure, based on the IGD.

STEP S214: If a success response is returned from the gateway 110, then the setting control unit 1001 of the on-premise terminal 100 performs the setting success confirming process (refer to FIG. 6), which is discussed later, and confirms whether the packet was actually relayed in accordance with the setting of the NAT information. If a failure response is returned, then the method transitions, for example, to step S210, and may try to modify or reset the parameters. In addition, it may try to reset the same parameters. In addition, if a failure occurred in overwriting already existing NAT information of one's own, then it may determine that as a success.

The above process makes it possible to prevent interference with the communication of another on-premise terminal because it does not overwrite the relay information of another on-premise terminal when the on-premise terminal 100 sets relay information, such as NAT information, in the gateway 110.

(2) Setting Success Confirming Process

Figure 6:
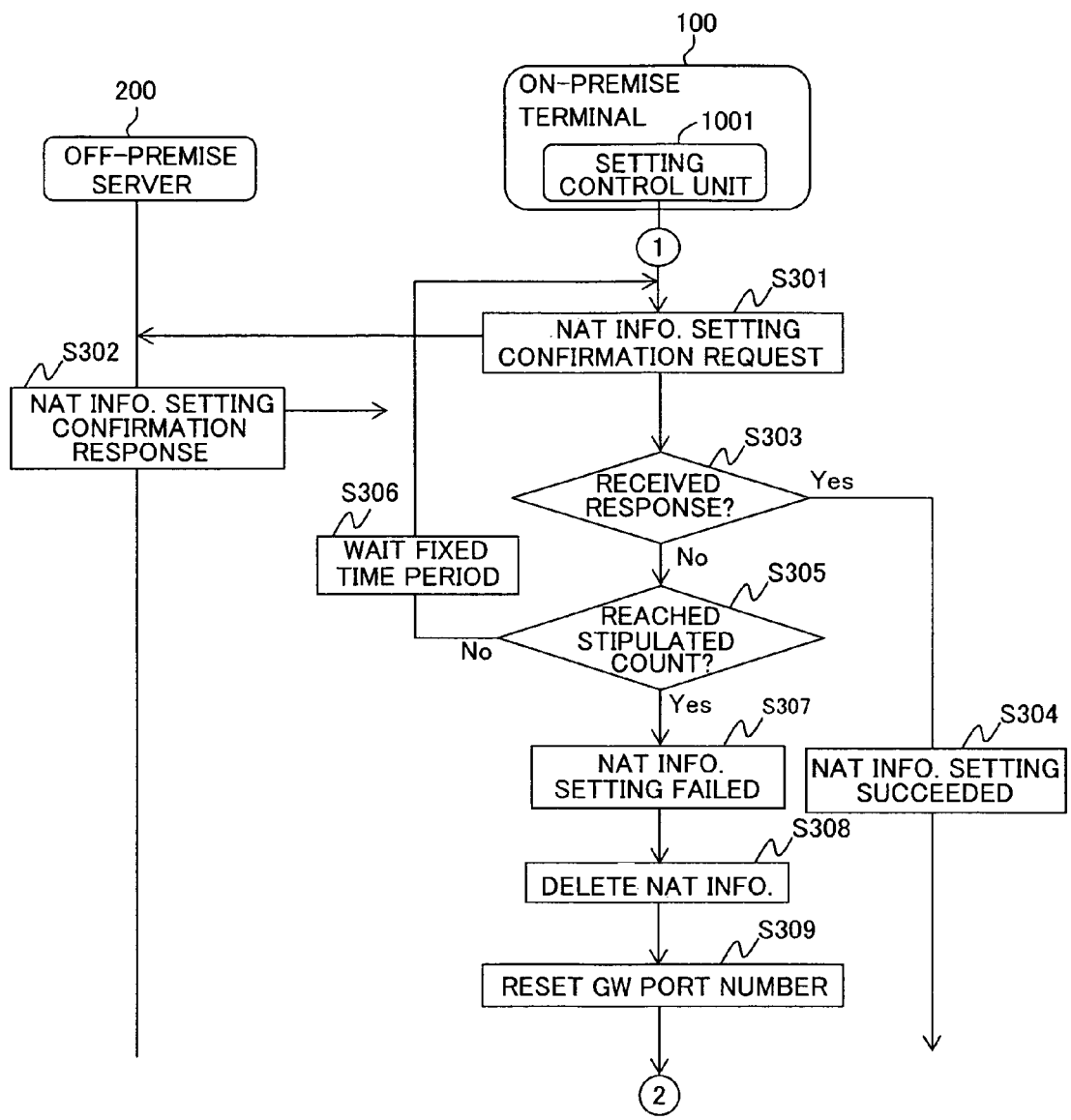
FIG. 6 is an explanatory diagram that depicts one example of the flow of a setting success confirming process.

FIG. 6 is an explanatory diagram that depicts one example of the flow of the setting success confirming process. If the gateway 110 in the abovementioned duplicate setting preventing process (refer to FIG. 3) returns (S213) a response indicating the success of the NAT information setting to the on-premise terminal 100, then it is preferable to perform this setting success confirming process after that response is returned. This process makes it possible to confirm whether a packet from an arbitrary terminal on the global network 001 can actually be received based on the set NAT information. A valid reason for such a confirmation is as follows.

Even assuming that the setting of the NAT information succeeded, there is still a possibility that a packet from a terminal on the global network 001 is not relayed to the local network 002 because of a packet filter and the like set in the gateway 110. Yet another possibility is that the on-premise terminal 100 may be connected so that it is subordinate to a plurality of gateways. In this case, it is conceivable that a packet from a terminal on the global network 001 cannot be received merely by the setting of NAT information in the gateways that are directly connected. The following explains the process in accordance with FIG. 6.

STEP S301: The setting control unit 1001 of the on-premise terminal 100 transmits a NAT information duplicate confirmation request to the off-premise server 200 that exists on the global network 001. This request includes, among the NAT information set in the gateway 110, the port number "Port110" of the gateway 110 on the global network 001. FIG. 7(*a*) lists the parameter included in the NAT information duplicate confirmation request. FIG. 7(*b*) lists a concrete example of a NAT duplicate confirmation request parameter in the present embodiment.

STEP S302: When a NAT information duplicate confirmation request is received, the off-premise server 200, based on the parameter "Port110" included therein, transmits a NAT information duplicate confirmation response to the port "Port110" of the gateway 110. The contents included in the response are arbitrary, and the packet may even be a null packet.

STEPS S303-S306: The setting control unit 1001 of the on-premise terminal 100 confirms whether a response has been received from the off-premise server 200 (S303); if a response was received, then the setting control unit 1001 determines that the setting of the NAT information succeeded (S304). In this case, the setting control unit 1001 may store the NAT information set in the gateway 110 until it is deleted by the deletion confirming process, which is discussed later. Storing the NAT information that was set also makes it possible to prevent the unfortunate overwriting of NAT information, which was already set by an on-premise terminal, by a different port number (NewInternalPort in FIG. 4(*a*)). If a response from the off-premise server 200 was not received, then a NAT information duplicate confirmation request is transmitted every fixed period of time until the number of transmissions of the NAT information duplicate confirmation requests reaches a stipulated count (S305, S306).

STEP S307: If a response is not received even though the number of transmissions of the NAT information duplicate confirmation requests has reached the stipulated count, then the setting control unit 1001 of the on-premise terminal 100 determines that the setting of the NAT information failed.

STEP S308: The setting control unit 1001 transmits a request to delete the set NAT information preferably to the gateway 110. This is because even if the setting of the NAT information fails, that information may remain in the gateway 110, and there are cases wherein the port of the gateway 110 may be needlessly disclosed. As the API to request the deletion of the NAT information, it is possible to use, for example, "DeletePortMapping" stipulated in the IGD, or another interface can be used. If using "DeletePortMapping", then the parameters sent and received between the on-premise terminal 100 and the gateway 110 are described in detail in (4) SETTING DELETING PROCESS, which is discussed later.

STEP S309: The setting control unit 1001 attempts to once again set the NAT information by modifying the first parameter of the stored NAT information, i.e., the port number "Port110" of the gateway 110 (step S201 in FIG. 3). By setting the NAT information to other relay information, it is possible to prevent a situation wherein communication cannot be relayed and to ensure the reliability of the communication.

The above process makes it possible to confirm whether a packet has actually been relayed in accordance with the NAT information set by the duplicate setting preventing process, and to enhance the safety and reliability of communication.

(3) Setting Periodic Confirming Process

Figure 8:
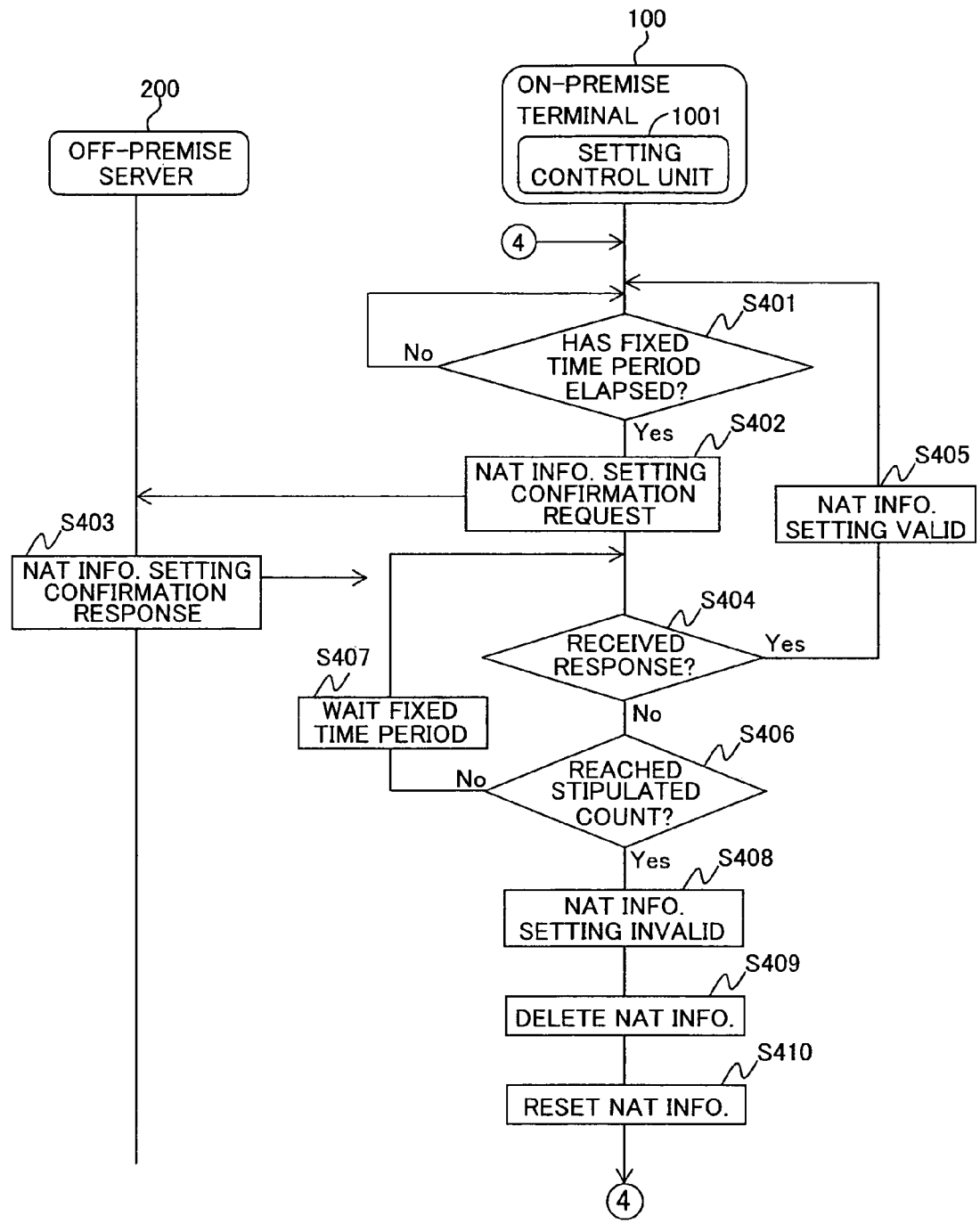
FIG. 8 is an explanatory diagram that depicts one example of the flow of a setting periodic confirming process.

FIG. 8 is an explanatory diagram that depicts one example of the flow of the setting periodic confirming process. This process is preferably performed after the duplicate setting preventing process, which was discussed earlier. This process makes it possible to periodically confirm, after NAT information has been validly set in the gateway 110, whether that setting is valid. Namely, it is possible to detect the fact that the NAT information of the on-premise terminal itself has been overwritten by another on-premise terminal, or has been deleted; as a result, it is possible to prevent interference with communication that is being executed by itself. The following explanation is based on FIG. 8.

STEP S401: After the setting control unit 1001 of the on-premise terminal 100 has set the NAT information in the gateway 110, it executes the following process in steps S402-S410 at fixed intervals.

STEP S402: The setting control unit 1001 transmits a NAT information duplicate confirmation request to the off-premise server 200 on the global network 001. This request includes, among the NAT information that was set by the gateway 110 in the duplicate setting preventing process, the port number "Port110" of the gateway 110. The parameter included in the NAT information duplicate confirmation request is as depicted in the abovementioned FIG. 7.

STEP S403: When a NAT information duplicate confirmation request is received, the off-premise server 200 transmits a packet to the port "Port110" of the gateway 110. Similar to step S302 above, the contents of the packet may be anything, and the packet may even be a null packet.

STEPS S404-S407: The setting control unit 1001 of the on-premise terminal 100 confirms (step S404) whether a response has been received from the off-premise server 200; if a response has been received, then the setting control unit 1001 determines (step S405) that the setting of the NAT information is still valid. If a response is not received, then the setting control unit 1001 transmits (steps S406, S407) NAT information duplicate confirmation request at fixed intervals until the number of transmissions of the NAT information duplicate confirmation requests has reached a stipulated count.

STEP S408: If a response has not been received even though the number of transmissions of the NAT information duplicate confirmation requests has reached the stipulated count, then the setting control unit 1001 of the on-premise terminal 100 determines that the setting of the NAT information has become invalid.

STEP S409: The setting control unit 1001 transmits a request to delete the set NAT information, preferably to the gateway 110. This is because the NAT information that has become invalid may remain in the gateway 110, and there is consequently a risk that the port of the gateway 110 cannot be effectively utilized. As the API for the request to delete the NAT information, it is possible to use, for example, "DeletePortMapping," which is stipulated in the IGD, or to use another interface. If using "DeletePortMapping," then the parameters sent and received between the on-premise terminal 100 and the gateway 110 are described in detail in (4) SETTING DELETING PROCESS, which is discussed later.

STEP S410: The setting control unit 1001 resets the NAT information to the same parameters as before. Furthermore, in consideration of the possibility that the NAT information will unfortunately overwrite the setting of another on-premise terminal, the NAT information may be reset by modifying the port number of the gateway 110 to another port number. Regardless of whether the same NAT information or modified NAT information is set, the duplicate setting preventing process returns to step S201, where the setting can be performed once again from the start.

Once this process has set relay information, such as NAT information, in the gateway 110, it thereafter periodically confirms the validity of that setting, which makes it possible to rapidly detect whether the setting has become invalid. If the setting has become invalid, then communication can be resumed by once again setting the same or different relay information, which enhances the safety and reliability of communication.

(4) Setting Deleting Process

Figure 9:
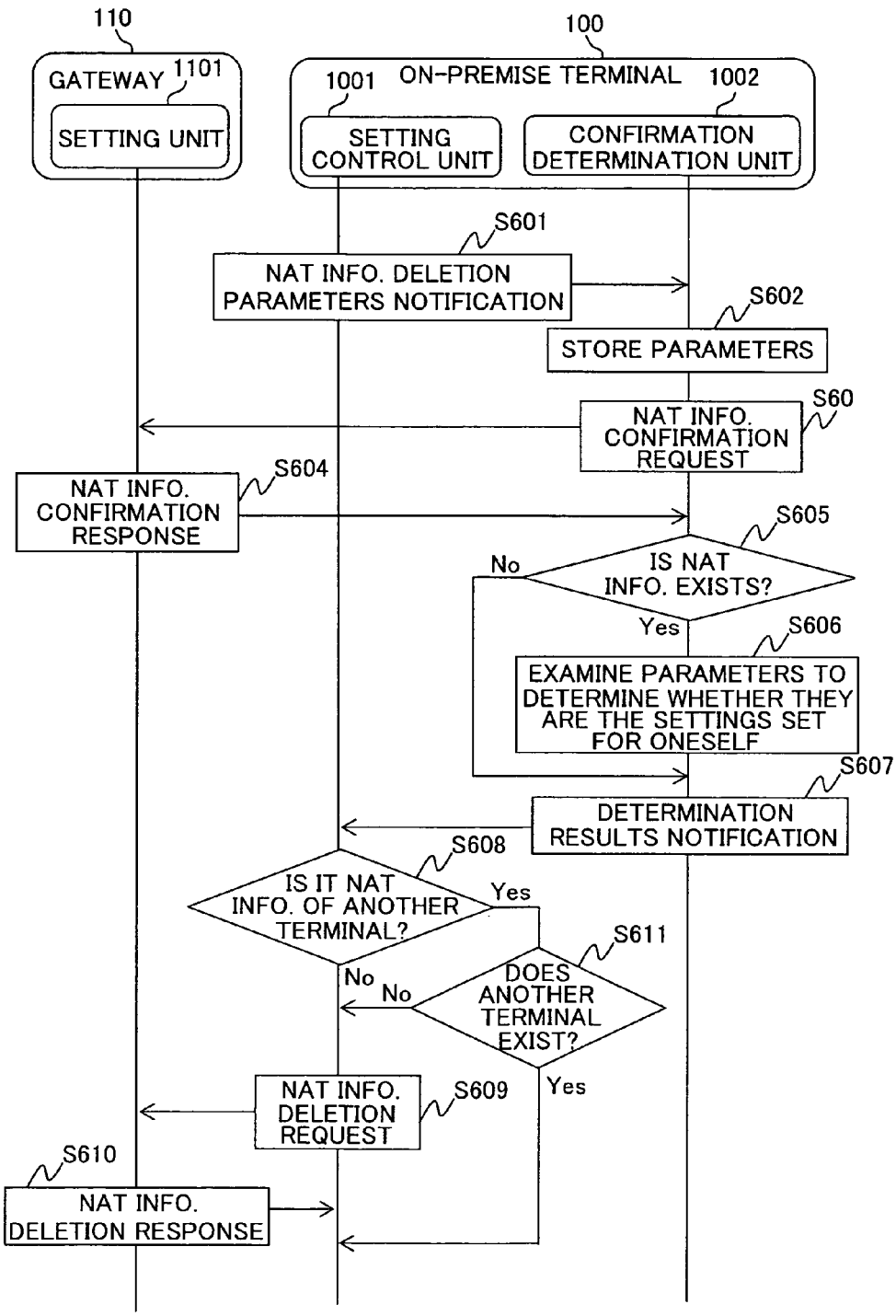
FIG. 9 is an explanatory diagram that depicts one example of the flow of a setting deleting process.

FIG. 9 is an explanatory diagram that depicts one example of the flow of the setting deleting process. In this process, the on-premise terminal 100 requests the gateway 110 to delete NAT information. When the on-premise terminal 100 requests the gateway 110 to delete NAT information, this process prevents the deletion of NAT information that was set for another on-premise terminal. As a result, it is possible to prevent the interference of communication of another on-premise terminal. The timing of the execution of this process is not particularly limited, and may be timed in accordance with the communication unit 1003 of the on-premise terminal 100. The following explanation is made based on FIG. 9.

STEPS S601-S602: The setting control unit 1001 of the on-premise terminal 100 notifies (S601) the confirmation determination unit 1002 of the parameters needed in order to request the deletion of NAT information. The NAT information deletion parameters, for which notification was given, are stored (S602) by the confirmation determination unit 1002 in a storage unit (not shown).

Here, the NAT information deletion parameters include at least the port number of the gateway 110 on the global network 001. FIG. 10(a) lists the NAT information deletion parameters for the case wherein "DeletePortMapping," which is stipulated by the IGD, is used as the API for the NAT deletion request. Of course, another interface may also be used. FIG. 10(d) lists a concrete example of the "DeletePortMapping" parameters in the present embodiment.

STEP S603: The confirmation determination unit 1002 of the on-premise terminal 100 transmits a NAT information confirmation request to the setting unit 1101. This request includes, among the parameters for which a notification was given, the port number "Port110" of the gateway 110. This request inquires with the gateway 110 whether NAT information corresponding to this port number "Port110" exists. Here, if the previously discussed "GetSpecificPortMappingEntry" is used as an API equivalent to a NAT information confirmation request, then the request comprises the parameters listed in FIG. 5(*a*).

STEP S604: Based on the received NAT information confirmation request, the setting unit 1101 of the gateway 110 checks for the existence of NAT information corresponding to the parameter "Port110," and returns a response to the on-premise terminal 100. The parameters listed in FIG. 5(*b*) or (*c*) are returned in response to the request by the "GetSpecificPortMappingEntry."

STEP S605: The confirmation determination unit 1002 of the on-premise terminal 100 receives the NAT information confirmation response and determines, based on that response, whether NAT information corresponding to the port number "Port100," which was inquired about, exists. This determination method is the same as step S205 in the abovementioned duplicate setting preventing process.

STEPS S606-S607: If the NAT information exists, then the confirmation determination unit 1002 determines (S606) whether it is the NAT information that was set by the on-premise terminal itself, or NAT information that was set by another on-premise terminal, and notifies (S607) the setting control unit 1001 of the determination result. This determination method is the same as in step S206 in the abovementioned duplicate setting preventing process.

STEPS S608-S609: If the NAT information, for which a deletion attempt is being made, is the NAT information that was set by the on-premise terminal 100 itself (S608), then the setting control unit 1001 issues a NAT information deletion request to the setting unit 1101 of the gateway 110 (S609). This request is issued based on the NAT information deletion parameters stored in step S602. In addition, if the NAT information, for which a deletion attempt is being made, is a setting for another on-premise terminal, then the method transitions to step S611, which is discussed later. This is because if the NAT information is deleted as is, then there would be a risk of interfering with the communication of another on-premise terminal. Furthermore, if a response is received to the effect that the NAT information, for which a deletion attempt is being made, does not exist, then the setting control unit 1001 may either not transmit a NAT information deletion request, or transmit a NAT information deletion request for good measure.

STEP S610: The setting unit 1101 of the gateway 110 transmits a NAT information deletion response, which includes the information about whether the deletion of the NAT information succeeded or failed, to the on-premise terminal 100. FIGS. 10(*b*) and (*c*) list the response status code and the parameter for the cases of success and failure, respectively.

STEP S611: If the NAT information, for which a deletion attempt is being made, is a setting for another on-premise terminal, the setting control unit 1001 preferably confirms whether another on-premise terminal exists, for example, by ICMP or ARP. If another on-premise terminal does exist, then deletion is not performed; if another on-premise terminal does not exist, then the method transitions to step S609 and a NAT information deletion request can be transmitted.

In steps S603-S607 in the process discussed above, a NAT information confirmation request is transmitted to the setting unit 1101 of the gateway 110, and a determination is made, based on that response parameter, whether the NAT information is the NAT information of one's own on-premise terminal. However, it is also possible to have a packet sent from the external server 200 on the global network 001 to the port "Port110" of the gateway 110, and then to determine whether that setting is one's own by whether the packet reaches the port "Port100" of one's own on-premise terminal.

Furthermore, the following example is conceivable as the timing for executing the present setting deleting process. For NAT information set by one's own on-premise terminal, acquire the NAT information from the setting unit 1101 of the gateway 110 every fixed period of time, and delete that NAT information by the present process if it was set by one's own on-premise terminal and is not currently being used.

The above process makes it possible to prevent an on-premise terminal from deleting the NAT information set for another on-premise terminal, and thereby to prevent interference with the communication of that on-premise terminal.

(5) Deletion Confirming Process

Figure 11:
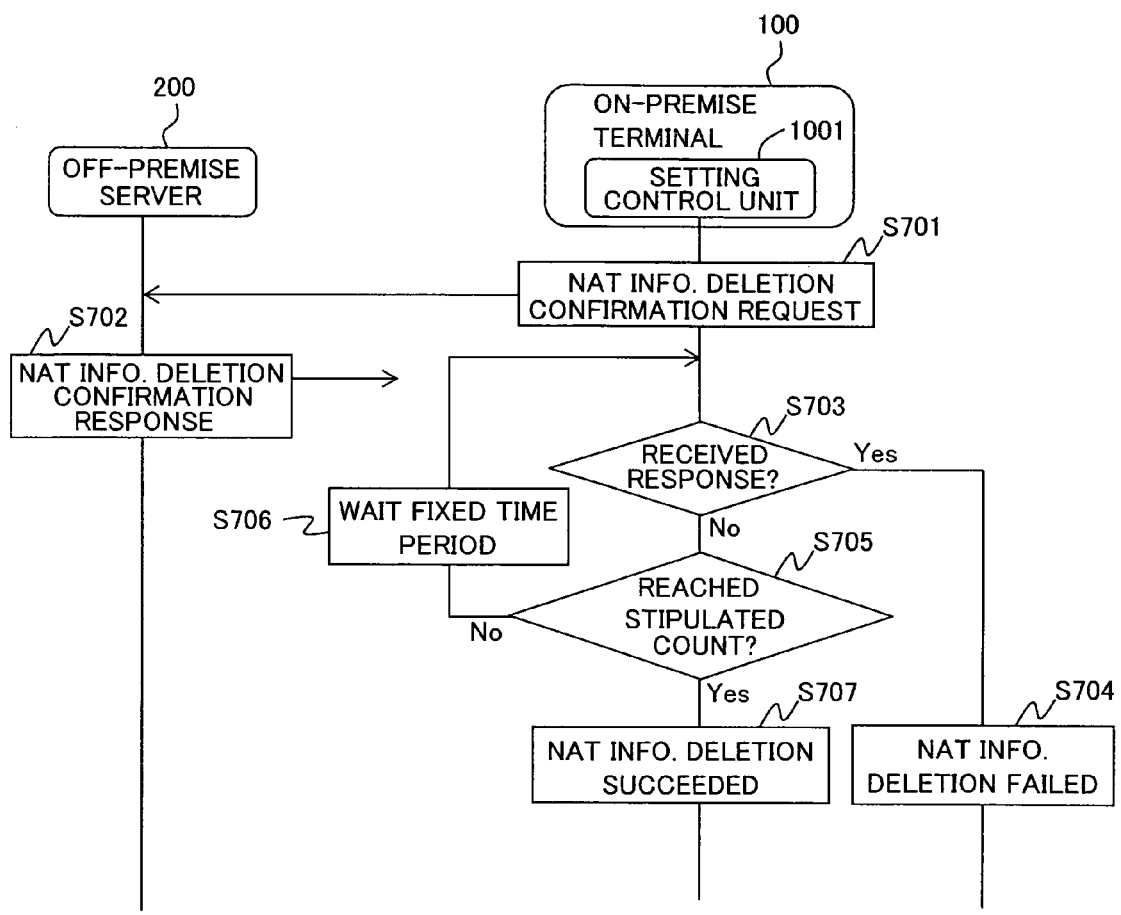
FIG. 11 is an explanatory diagram that depicts one example of the flow of a deletion confirming process.

FIG. 11 is an explanatory diagram that depicts one example of the flow of the deletion confirming process. The purpose of this process is to confirm, after NAT information has been deleted in the abovementioned setting deleting process, whether the NAT information is actually deleted. The following explanation is based on FIG. 12.

STEP S701: The setting control unit 1001 of the on-premise terminal 100 transmits a NAT information deletion confirmation request to the off-premise server 200 on the global network 001. This request includes the port number "Port110" of the gateway 110, which was included in the NAT information deletion parameter used in the abovementioned setting deleting process. FIG. 12(*a*) lists the parameter included in the NAT information deletion confirmation request. FIG. 12(*b*) is a concrete example of the NAT information deletion confirmation request parameter in the present embodiment.

STEP S702: When the off-premise server 200 receives a NAT information deletion confirmation request, it transmits a packet, based on the parameter included in that request, to the port "Port110" of the gateway 110. The contents of this packet are arbitrary, and the packet may even be a null packet.

STEPS S703-S707: The setting control unit 1001 of the on-premise terminal 100 confirms (S703) whether a response was received from the off-premise server 200; if a response was received, then it determines (step S704) that the deletion of the NAT information failed. If it is determined that the deletion failed, then the abovementioned setting deleting process (FIG. 9) may be performed once again. If a response from the off-premise server 200 has not been received, then the setting control unit 1001 transmits (S705, S706) a NAT information deletion confirmation request every fixed time period until the number of transmissions of the NAT information deletion confirmation requests reaches a stipulated count.

STEP S707: If a response is not received from the off-premise server 200 even though the number of transmissions reaches the stipulated count, then the setting control unit 1001 determines that the deletion of the NAT information succeeded. If NAT information set by the setting control unit 1001 is stored (refer to step S304), then, after confirming the deletion of the NAT information in step S707, the NAT information stored by the setting control unit 1001 itself is deleted.

Furthermore, as another method, the determination as to whether the deletion of the NAT information succeeded may be made by confirming the presence of the NAT information by, for example, using "GetSpecificPortMappingEntry," which is stipulated by the IGD.

This makes it possible to ensure the safety of communication by confirming the deletion of NAT information that was set by an on-premise terminal.

Second Embodiment

Figure 13:
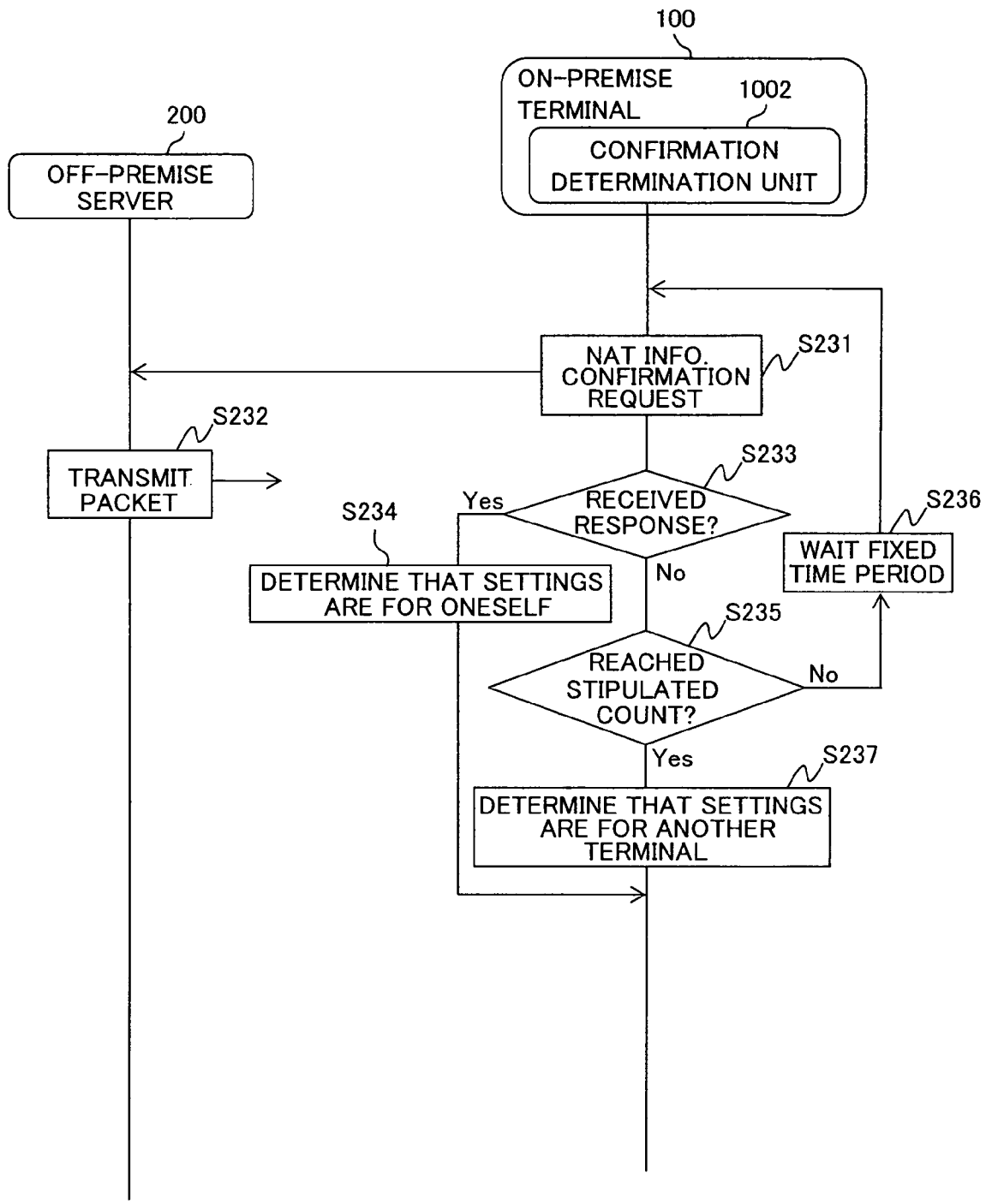
FIG. 13 is an explanatory diagram that depicts one example of the flow of part of the duplicate setting preventing process according to the second embodiment.

FIG. 13 is an explanatory diagram that depicts one example of the flow of part of the duplicate setting preventing process according to the second embodiment. The following process may be performed in place of step S206 in the abovementioned duplicate setting preventing process in the first embodiment. In step S206, the determination as to whether the NAT information is of one's own on-premise terminal is made based on a response given by the gateway 110 with respect to the NAT information confirmation request. However, the determination as to whether the NAT information is of one's own on-premise terminal may be made by having the external server 200 on the global network 001 transmit a packet to the port "Port110" of the gateway 110, and checking whether that packet arrives at the port "Port100" of one's own on-premise terminal. The following explains the flow of the duplicate setting preventing process according to the second embodiment, referencing FIG. 13.

First, steps S201-S204 are executed, the same as in the first embodiment, to confirm with the gateway 110 whether the NAT information, for which a setting attempt is being made, exists. If that NAT information exists, then the following process is performed. If it does not exist, then the method transitions to step S207, the same as discussed earlier, and there is therefore no need to perform the following process.

STEP S231: If the NAT information, for which a setting attempt is being made, exists in the gateway 110, then the confirmation determination unit 1002 transmits a NAT information duplicate confirmation request to the off-premise server 200, which exists on the global network 001. This request includes, among the NAT information setting parameters for which a notification was sent as depicted in FIG. 7(a), the port number "Port110" of the gateway 110 on the global network 001.

STEP S232: When the off-premise server 200 receives the NAT information duplicate confirmation request, it transmits, based on the parameter "Port110" included therein, a NAT information duplicate confirmation response to the port "Port110" of the gateway 110. The contents included in that response are arbitrary, and the packet may even be a null packet.

STEPS S233-S236: The setting control unit 1001 of the on-premise terminal 100 confirms (S233) whether a response has been received from the off-premise server 200; if a response has been received, then the setting control unit 1001 determines (S234) that NAT information of one's own on-premise terminal 100 exists. If a response is not received, then the setting control unit 1001 transmits (S235, S236) a NAT information duplicate confirmation request every fixed time period until the number of transmissions of the NAT information duplicate confirmation requests reaches the stipulated count.

STEP S237: If a response is not received even though the number of transmissions of the NAT information duplicate confirmation requests reaches the stipulated count, then the setting control unit 1001 of the on-premise terminal 100 determines that the NAT information is for another on-premise terminal.

Thereafter, the process from step S207 through step S214 is performed, the same as in the first embodiment, based on the determination of whether the NAT information is of one's own on-premise terminal 100, and based on the fact that the NAT information, for which a setting attempt is being made, does not exist in the gateway 110.

Third Embodiment

Figure 14:
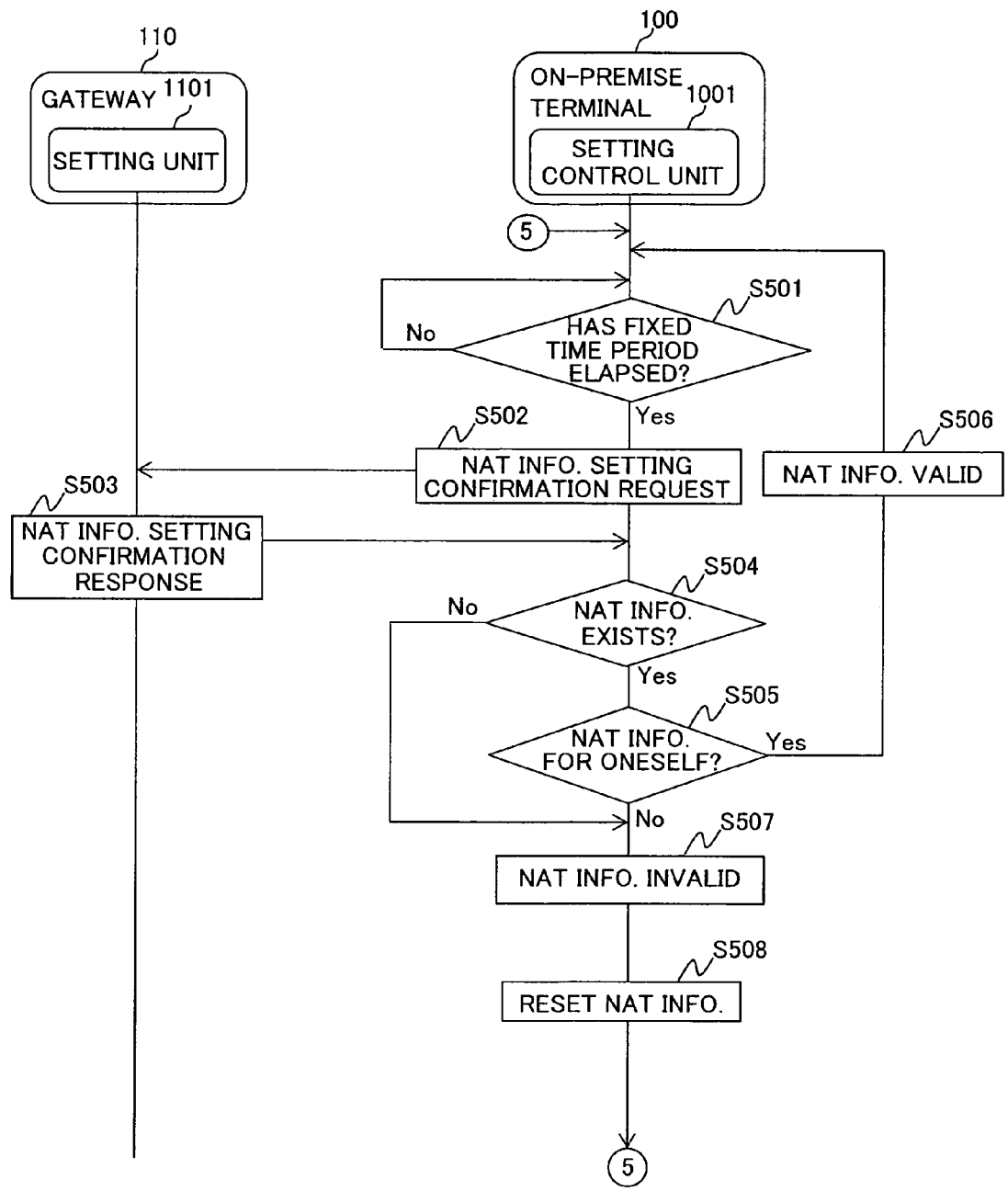
FIG. 14 is an explanatory diagram that depicts one example of the flow of the setting periodic confirming process according to the third embodiment.

In the setting periodic confirming process of the first embodiment, the NAT information duplicate confirmation request is transmitted to the off-premise server 200, but another method is also possible. For example, FIG. 14 is an explanatory diagram of a method that confirms whether a NAT setting is valid or invalid by using an API called "GetSpecificPortMappingEntry," which is stipulated by the IGD.

STEP S501: After the on-premise terminal 100 has validly set the NAT information in the gateway 110, it repeatedly performs the following process at fixed intervals.

STEP S502: The setting control unit 1001 of the on-premise terminal 100 transmits a NAT information duplicate confirmation request (refer to FIG. 5(a)) by a "GetSpecificPortMappingEntry" action to the gateway 110. This request includes, among the NAT information that was set by the duplicate setting preventing process, the port number "Port110" of the gateway 110.

STEP S503: If the setting unit 1101 of the gateway 110 receives a NAT duplicate confirmation request, then it searches the relay table 1103 by using the port number "Port110" included therein as a key. As a result of the search, a response as to whether NAT information that includes "Port110" exists is transmitted to the on-premise terminal 100 (refer to FIGS. 5(b) and (c)).

STEPS S504-S506: The setting control unit 1001 of the on-premise terminal 100 determines, based on the received response, whether NAT information that includes "Port110" exists (S504). If it does exist, then it determines whether the existing NAT information is the NAT information that was set by oneself (S505). This method of determination is as mentioned in step S206 of the duplicate setting preventing process. If it is the NAT information that was set by oneself, then the setting control unit 1001 determines that the NAT information is valid (S506).

STEP S507: If the NAT information is not the NAT information that was set by one's own on-premise terminal, or if NAT information that is assumed to have been set does not exist, then the setting control unit 1001 determines that the NAT information is invalid.

STEP S508: The setting control unit 1001 once again sets the NAT information in the gateway 110 with the same parameters as before. Furthermore, in consideration of the possibility of overwriting a setting of one's own or another's on-premise terminal, the port number of the gateway 110 may be reset by modifying it to another port number, the same as in the first embodiment.

Furthermore, similar to the first embodiment, a request to delete the NAT information that was determined to have become invalid may be transmitted to the gateway 110 after step S507. This is because, even though the setting has become invalid, the NAT information might possibly remain in the gateway 110.

The validity of the NAT information that was set can be periodically confirmed by the above method. This process is preferably performed after confirming by the setting success confirming process in FIG. 6 that relaying was actually performed based on the NAT setting. This is because if the setting success confirming process has confirmed that data was correctly relayed based on the set NAT information, then it is thereafter sufficient just to inquire with the gateway 110 about the presence of the setting of NAT information.

By using the method discussed herein, it is also possible, when the on-premise terminal 100 sets the NAT information, to confirm whether NAT information has already been set that is the same as the NAT information for which a setting attempt is about to be made. This is because, if that NAT information has already been set in the gateway 110, then it can be reused. The confirming process may be performed in place of steps S203-S206 in the duplicate setting preventing process. Here, as a method that determines whether the NAT information is the NAT information set by one's own on-premise terminal, it can be performed the same as step S206 in the duplicate setting preventing process.

Other Embodiments (A) In step S206 of the first embodiment, the determination as to whether already existing NAT information is that of one's own on-premise terminal 100 is made based on the IP address (the value of the "NewInternalClient" parameter in the NAT information confirmation response).

However, if the on-premise terminal 100 determines whether the NAT information is that of one's own based solely on the "NewInternalClient" value, then there is a possibility that the determination will be in error if the IP address "IPL100" of the on-premise terminal 100 has changed.

For example, let us assume that, when the IP address of the on-premise terminal 100 is "IPL100," the following NAT information has already been set in the gateway 110 by the method in FIG. 3: "a packet that arrives at 'Port110' of the gateway 110 from an arbitrary terminal on the global network 001 is relayed to the 'Port100' of the on-premise terminal that has 'IPL100' on the local network 002."

STEP S201: First, the setting control unit 1001 of the on-premise terminal 100 notifies the confirmation determination unit 1002 of the parameters needed to request the setting of NAT information. The NAT information setting parameters include at least the following three parameters:

(i) The port number "Port110" of the gateway 110 on the global network 001

(ii) The IP address "IPL200" of the on-premise terminal 100 on the local network 002

(iii) The port number "Port100" of the on-premise terminal 100 on the local network 002

STEP S202: The confirmation determination unit 1002 stores the NAT information setting parameters, for which a notification was sent, in a storage unit (not shown).

STEP S203: Next, the confirmation determination unit 1002 transmits a NAT information confirmation request to the setting unit 1101 of the gateway 110. The NAT information confirmation request includes at least the port number "Port110" of the gateway 110 included in the parameters for which a notification was sent from the setting control unit 1001. This request makes it possible to inquire with the gateway 110 whether the NAT information corresponding to that port number "Port110" is already set.

STEP S204: The setting unit 1101 of the gateway 110 references the relay table 1103, and searches for NAT information corresponding to the parameter "Port110" included in the received NAT information confirmation request. Because NAT information corresponding to "Port110" already exists as a prerequisite, a NAT information confirmation response that includes that NAT information is transmitted to the on-premise terminal 100.

STEP S205: When the confirmation determination unit 1002 receives a NAT information confirmation response from the gateway 110, it confirms the content of that response. Namely, the confirmation determination unit 1002 determines whether NAT information corresponding to the port number "Port100" that was inquired about exists.

STEPS S206-S207: Because NAT information corresponding to the port number "Port100" that was inquired about exists, the confirmation determination unit 1002 compares the parameter included in that response with the NAT information setting parameters stored in step S202. Furthermore, based on those comparison results, the confirmation determination unit 1002 determines whether that NAT information is the NAT information set by oneself or whether it duplicates NAT information set by another on-premise terminal (S206), and notifies the setting control unit 1001 of the determination results (S207). Here, because this determination is made based on the "(ii) IP address (IPL200) of the on-premise terminal 100 on the local network 002" in the NAT information setting parameters, as well as on the IP address "IPL100" of the on-premise terminal in the response, it will be mistakenly determined that both do not match and that the NAT information duplicates the setting for another on-premise terminal.

Consequently, because the parameters of the NAT information are reset in step S210 and the process is performed once again from step S201, new NAT information is set, while the NAT information that was set before the change in the IP address remains as is in the gateway 110. Therefore, a parameter may be newly provided that can imbed an ID, such as the MAC address or time information, that can uniquely specify oneself, and it is possible to determine, even after a change in the IP address, whether the NAT information is the NAT information that was set by oneself before the change in the IP address by performing a comparison based on that ID.

For example, let us consider a case wherein a new parameter is set in the IGD standard of the UPnP protocol. First, an ID that uniquely specifies the on-premise terminal 100, the ID consisting of the MAC address of the on-premise terminal 100, the time information, and the like is embedded as the value of the "NewPortMappingDescription" parameter in the "AddPortMapping" depicted in FIG. 4(a). Namely, that ID is stored as NAT information in the relay table 1103 of the gateway 110. Furthermore, the gateway 110 describes the ID, which is specified in the NAT information, in the "NewPortMappingDescription" parameter in the response (FIG. 5(b)) to the NAT information confirmation request by the "GetSpecificPortMappingEntry." In so doing, the on-premise terminal 100 that receives the NAT information confirmation response can determine whether the already existing NAT information is one's own by comparing one's own ID with the ID in the NAT information confirmation response.

Figure 15:
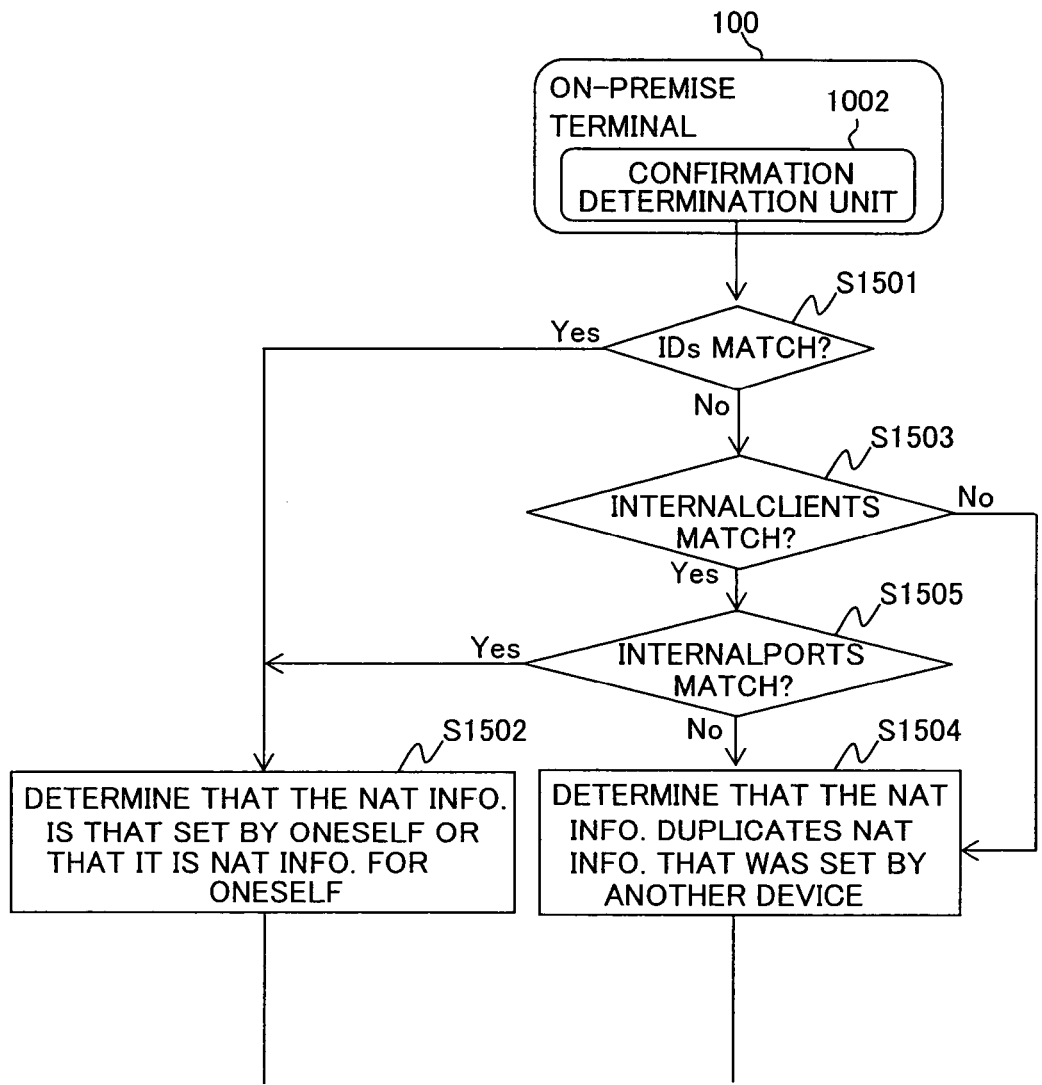
FIG. 15 is an explanatory diagram that depicts one example of a process performed by a confirmation determination unit when the determination of step S206 in FIG. 3 is made by using IDs.

The following explains, referencing FIG. 15, the operation of a confirmation determination unit for the case wherein an ID is used in step S206 of the first embodiment to determine whether already existing NAT information is the NAT information of one's own on-premise terminal 100.

STEP S1501: The confirmation determination unit 1002 first compares one's own ID with the ID included in the value of the "NewPortMappingDescription" parameter in the NAT information confirmation response.

STEP S1502: If the IDs match, then the determination is made that that NAT information is the NAT information set by oneself.

If the IDs do not match, then a determination is made that that NAT information is not the NAT information set by oneself. Here, even if it is NAT information that was not set by one's own on-premise terminal 100, it can be determined that it is acceptable to overwrite or delete that NAT information if the "NewInternalClient" and the "NewInternalPort" in those parameters match one's own IP address and the port to be used.

This is because, for example, the on-premise terminal 101 that has the IP address "IPL101" has already set, by the method in FIG. 3, in the gateway 110 the following NAT information: "a packet that arrives at 'Port110' of the gateway 110 from an arbitrary terminal on the global network 001 is relayed to 'Port100' of the on-premise terminal that has 'IPL101' on the local network 002". Thereafter, if the IP address of the on-premise terminal 101 is switched to "IPL100" and the IP address of the on-premise terminal 100 is switched to "IPL101" by the system restart and the like after a sudden power supply cutoff, then the abovementioned NAT information is set in the on-premise terminal 100, and it can be determined that it is meaningless NAT information for the on-premise terminal 101.

STEPS S1503-S1504: Consequently, if it is determined that the IDs do not match in step S1501, then a comparison is made (S1503) between one's own IP address and the value of the "NewInternalClient" parameter in the NAT information confirmation response. If they do not match, then it is determined (S1504) that it duplicates the NAT setting of other equipment.

STEP S1505: If the IP addresses match, then a further comparison is made (S1505) to determine whether the value of the "NewInternalPort" parameter in the NAT information confirmation response matches the "NewInternalPort" parameter in the NAT information setting request with respect to the NAT information for which a setting attempt is being made by oneself. If they do not match, then it is determined (S1504) that the NAT information duplicates the NAT information set by other equipment. If they do match, then it is determined that that NAT information is the setting for oneself (S1502).

As discussed above, by first making a determination based on an ID that can specify oneself, it is possible, despite a change in the IP address due to restarting and the like after a sudden power supply cutoff, to accurately determine whether the NAT information is the NAT information previously set by oneself, even if the previously set NAT information remains. Conversely, it is also possible, even if the NAT information is the NAT information set by other equipment, to determine whether it is acceptable to overwrite or delete that NAT information by confirming whether that NAT information is a setting for oneself. Thereby, overwriting and deleting the NAT information has the effect of preventing a continual buildup of needless NAT information in the relay table 1103 of the gateway 110.

The operation subsequent to the determination in step S206 of FIG. 3 by the determining method using the abovementioned IDs, which determines whether the NAT information is the NAT information set by oneself, conforms to the sequence from step S207 onward in FIG. 3.

Furthermore, if the method has proceeded to step S1502 as a result of the port comparison in step S1505 of FIG. 15, i.e., if it has been determined that "The IDs do not match and the NAT information was set by another device, but the IP addresses and the port numbers match, so the NAT information is for oneself," then, before transmitting a NAT information setting request to the gateway 110 by step S212 in FIG. 3 as the subsequent operation, it is preferable, just to be on the safe side, to delete the NAT information from the gateway 110 by transmitting a NAT information deletion request by a procedure the same as in step S609 in FIG. 9. This is because, if an attempt is made to overwrite NAT information that duplicates the NAT information of other equipment in the gateway 110, then there is a possibility that the request to overwrite that NAT information will be rejected by the gateway 110. Consequently, it is preferable to initially delete that NAT information and then set NAT information anew.

Furthermore, in the first through third embodiments as well as in the present embodiment, when confirming whether the NAT information that was read from the gateway 110 duplicates the NAT information for which a setting attempt or deletion attempt is being made by oneself, the NAT information may be confirmed for each communication protocol (TCP, UDP, and the like) by also confirming whether the "NewProtocol" parameters match.

(B) When the first communication terminal 100 has transmitted a request to set NAT information to the gateway 110, it may store the NAT information until transmitting a request to delete that NAT information. The set NAT information is stored in order to reuse the same NAT information without setting it again.

Prior to reusing the NAT information, the first communication terminal 100 preferably determines whether NAT information that duplicates the stored NAT information is stored by the gateway 110. This determination may be performed by having a packet sent from the off-premise server 200. In addition, this determination may be made by sending a notification of the "Port110" to the gateway 110 in order to determine the presence of NAT information for the "Port110"; if the NAT information "exists," then a determination may be made as to its owner.

If NAT information for "Port110" of the gateway 110 is set to one's own first communication terminal 100, then the first communication terminal 100 can perform communication without setting the NAT information again.

Conversely, if the NAT information is set to another communication terminal, then the NAT information can be set again by the process discussed in steps S208-S210 of the abovementioned duplicate setting preventing process.

(C) The embodiments discussed above were explained taking as an example the case of setting or deleting NAT information, but the setting and deletion of relay information for a packet filter can also be performed by a similar procedure.

(D) The scope of the present invention includes a computer program that causes a computer to execute the method discussed above, and a computer readable storage medium whereon that program is recorded. Here, examples of storage media include a computer readable flexible disc, a hard disc, semiconductor memory, a CD-ROM, a DVD, a magneto-optic disk (MO), and the like.

INDUSTRIAL FIELD OF APPLICATION

The relay information processing method of the present invention can be adapted to a communication relay system that needs to set and delete relay information in a relay device that relays communications, and can thereby improve the safety and reliability of that communication.

The invention claimed is:

1. A relay information processing method wherein a first communication terminal sets and/or deletes first relay information included in relay information stored by a relay device that connects a first network and a second network, and the first relay information relaying a packet transmitted from a second communication terminal on said second network to said first communication terminal on said first network,
   the method comprising:
   a duplicate determining step wherein said first communication terminal acquires second relay information, which is already set in said relay device, prior to setting or deleting said first relay information in said relay device, and determines whether said relay information duplicates said first relay information;

a requesting step wherein said first communication terminal transmits a request to set or a request to delete said first relay information to said relay device only if it was determined that there is no duplication in said duplicate determining step; and a relay information updating step wherein said relay device stores said first relay information or deletes said first relay information from said relay information in accordance with said setting request or said deletion request;

wherein each of said first and second relay information comprises a first parameter that includes at least port number information possessed by said relay device on said second network; a second parameter that is the address of a communication terminal on said first network; and a third parameter that includes port number information of the communication terminal on said first network;

said method further comprising:

a transferring step wherein said relay device transfers data that arrives at a port specified by said first parameter to a port specified by said third parameter from amongst the ports possessed by the communication terminal specified by said second parameter.

2. A relay information processing method as recited in claim 1, wherein said duplicate determining step comprises:

a step wherein said first communication terminal transmits a duplicate confirmation request to said relay device; and a step wherein said relay device transmits a duplicate confirmation response, which includes the second relay information, to said first communication terminal in response to said duplicate confirmation request;

said duplicate confirmation request comprises any port number that specifies a port possessed by said relay device on said second network; and said duplicate confirmation response comprises the second relay information for the port number specified by said duplicate confirmation request.

3. A relay information processing method as recited in claim 2, wherein said duplicate determining step further comprises a step wherein said first communication terminal compares the second parameter included in said second relay information in the duplicate confirmation response received from said relay device with the second parameter included in said first relay information, and, if both do not match, determines that said first relay information and said second relay information are duplicates.

4. A relay information processing method as recited in claim 2, wherein said relay information further comprises an identifier as a parameter that uniquely specifies said first communication terminal;

in said requesting step, said first communication terminal transmits a request to set said relay information to said relay device; and said duplicate determining step further comprises a step wherein said first communication terminal compares said identifier included in said second relay information in the duplicate confirmation response received from said relay device with said identifier included in said first relay information, and, if both do not match, determines that said first relay information and said second relay information are duplicates.

5. A relay information processing method as recited in claim 4, wherein said duplicate determining step further comprises the following steps executed by said first communication terminal:

an identifier comparing step that compares said identifier included in said second relay information with said identifier included in said first relay information;

a first determining step that determines that said first relay information and said second relay information are not duplicates if said both identifiers match in said identifier comparing step;

a parameter comparing step that further compares the second parameter included in said first relay information with the second parameter included in said second relay information if said both identifiers did not match in said identifier comparing step;

a second determining step that determines that the first relay information and the second relay information are not duplicates if said both second parameters match in said parameter comparing step; and a third determining step that determines that the first relay information and the second relay information are duplicates if said both second parameters did not match in said parameter comparing step.

6. A relay information processing method as recited in claim 1, further comprising:

a resetting step wherein, if it was determined in said duplicate determining step that said first relay information and said second relay information are duplicates, then said first communication terminal modifies said first relay information to third relay information;

wherein, said duplicate determining step, said requesting step, and said relay information updating step are executed for said third relay information.

7. A relay information processing method as recited in claim 1, further comprising:

a connection confirming step wherein, if it was determined in said duplicate determining step that said first relay information and said second relay information are duplicates, then said first communication terminal confirms whether another communication terminal, for which said first relay information is set, is connected to said first network;

wherein, if it was confirmed in said connection confirming step that said another communication terminal is not connected, then, in said requesting step, said first communication device transmits a request to set or a request to delete said first relay information to said relay device.

8. A relay information processing method as recited in claim 7, wherein in said requesting step, prior to transmitting a request to set said first relay information, said first communication device transmits to said relay device a request to delete said second relay information that duplicates said first relay information.

9. A relay information processing method as recited in claim 7, further comprising:

a resetting step wherein, if it was confirmed in said connection confirming step that another communication terminal is connected, then said first communication terminal modifies said first relay information to third relay information;

wherein, said duplicate determining step, said connection confirming step, said requesting step, and said relay information updating step are executed for said third relay information.

10. A relay information processing method as recited in claim 1, wherein said duplicate determining step further comprises:

a test data transmitting step wherein the communication terminal on said second network transmits to said relay device test data destined for said first communication terminal;

a test data determining step wherein said first communication terminal determines whether said test data has arrived at said first communication terminal; and a duplicate presence determining step wherein said first communication terminal determines, based on the determination result in said test data determining step, the presence of said second relay information that duplicates said first relay information.

11. A relay information processing method as recited in claim 1, wherein said requesting step further comprises:

a storing step wherein, if said first communication terminal has transmitted a request to set said first relay information, then said first communication terminal stores said first relay information until transmitting a request to delete said first relay information.

12. A relay information processing method as recited in claim 11, wherein said duplicate determining step further comprises:

a step wherein said first communication terminal further determines whether said relay device is storing relay information that duplicates the first relay information stored in said storing step.

13. A relay information processing method as recited in claim 12, wherein said duplicate determining step further comprises:

a step wherein, if it is determined that said relay device is storing relay information that duplicates said first relay information, then said first communication terminal further determines whether that relay information is set for said first communication terminal.

14. A relay information processing method as recited in claim 1, further comprising:

a relay inquiring step wherein, prior to said requesting step, said first communication terminal inquires with said relay device as to whether it is possible to set or delete said relay information in said relay device;

wherein, in said requesting step, said first communication terminal transmits said setting request or said deletion request to said relay device based on the response regarding whether said relay inquiry is possible.

15. A relay information processing method executed by a first communication terminal on a first network, a second communication terminal on a second network, and a relay device that connects said first network and said second network and that relays communication between said first and second networks based on relay information, the method comprising:

a setting step wherein said first communication terminal sets, in said relay device, first relay information for relaying data transmitted from said second communication terminal to said first communication terminal;

a setting confirming step wherein said first communication terminal inquires with said relay device about the presence of the setting of said first relay information;

a setting determining step wherein said first communication terminal determines based on a response from said relay device to said inquiry, whether said first relay information is set in said relay device; and a controlling step that periodically repeats said setting confirming step and said setting determining step wherein each of said first and second relay information comprises a first parameter that includes at least port number information possessed by said relay device on said second network; a second parameter that is the address of a communication terminal on said first network; and a third parameter that includes port number information of the communication terminal on said first network; said method further comprising:

a transferring step wherein said relay device transfers data that arrives at a port specified by said first parameter to a port specified by said third parameter from amongst the ports possessed by the communication terminal specified by said second parameter.

16. A relay information processing method as recited in claim 15, wherein said setting determining step comprises:

a step wherein a duplicate confirmation request is transmitted from said first communication terminal to said relay device; and a step wherein a duplicate confirmation response is transmitted from said relay device to said first communication terminal in response to said duplicate confirmation request;

said duplicate confirmation request comprises any port number that specifies a port possessed by said relay device on said second network; and said duplicate confirmation response comprises the second relay information for the port number specified by said duplicate confirmation request.

17. A relay information processing method as recited in claim 16, wherein said setting determining step further comprises a step wherein said first communication terminal compares the second parameter included in said second relay information in said duplicate confirmation response received from said relay device with the second parameter included in said first relay information, and, if both do not match, determines that said first relay information and said second relay information are duplicates.

18. A relay information processing method as recited in claim 16, wherein said relay information further comprises an identifier as a parameter that uniquely specifies said first communication terminal;

said requesting step transmits a request to set said relay information that includes the identifier, which uniquely specifies said first communication terminal, to said relay device; and said setting determining step further comprises a step wherein said first communication terminal compares said identifier included in said second relay information in said duplicate confirmation response received from said relay device with said identifier included in said first relay information, and, if both do not match, determines that said first relay information and said second relay information are duplicates.

19. A relay information processing method as recited in claim 18, wherein
said setting determining step further comprises the following steps executed by said first communication terminal:
an identifier comparing step that compares said identifier included in said second relay information with said identifier included in said first relay information;
a first determining step that, if said both identifiers match in said identifier comparing step, determines that said first relay information and said second relay information are not duplicates;
a parameter comparing step that, if said both identifiers did not match in said identifier comparing step, further compares the second parameter included in said first relay information with the second parameter included in said second relay information;
a second determining step that, if said both second parameters matched in said parameter comparing step, determines that the first relay information and the second relay information are not duplicates; and
a third determining step that, if said both second parameters did not match in said parameter comparing step, determines that the first relay information and the second relay information are duplicates.

20. A communication device that sets or deletes, in a relay device that connects a first network and a second network, first relay information included in relay information stored by said relay device, the first relay information relaying a packet transmitted from a second communication device on said second network to said first communication device on said first network, the device comprising:
a duplicate determining unit that acquires second relay information, which is already set in said relay device, prior to setting or deleting said first relay information in said relay device, and determines whether said second relay information duplicates said first relay information; and
a requesting unit that transmits a request to set or a request to delete said first relay information to said relay device only if it was determined that there is no duplication by said duplicate determining unit;
wherein each of said first and second relay information comprises a first parameter that includes at least port number information possessed by said relay device on said second network; a second parameter that includes the address information of a communication device on said first network; and a third parameter that includes the port number of the communication device on said first network.

21. A communication device as recited in claim 20, wherein
said duplicate determining unit comprises:
a unit for transmitting a duplicate confirmation request to said relay device; and
a unit for receiving from said communication device a duplicate confirmation response, which includes the second relay information, in response to said duplicate confirmation request;
said duplicate confirmation request comprises any port number that specifies a port possessed by said relay device on said second network; and
said duplicate confirmation response comprises the second relay information for the port number specified by said duplicate confirmation request.

22. A communication device as recited in claim 21, wherein
said duplicate determining unit further comprises a unit that compares the second parameter included in said second relay information in said duplicate confirmation response received from said relay device with the second parameter included in said first relay information, and, if both do not match, determines that said first relay information and said second relay information are duplicates.

23. A communication device as recited in claim 21, wherein
said relay information further comprises an identifier as a parameter that specifies said first communication terminal;
said requesting unit transmits a request to transmit said relay information that includes the identifier, which specifies said first communication terminal, to said relay device; and
said duplicate determining unit further comprises a unit that compares said identifier included in said second relay information in said duplicate confirmation response received from said relay device with said identifier included in said first relay information, and, if both do not match, determines that said first relay information and said second relay information are duplicates.

24. A communication device as recited in claim 23, wherein
said duplicate determining unit further comprises:
an identifier comparing unit that compares said identifier included in said second relay information with said identifier included in said first relay information;
a first determining unit that, if said identifier comparing unit determined that said both identifiers match, determines that said first relay information and said second relay information are not duplicates;
a parameter comparing unit that, if said identifier comparing unit determined that said both identifiers do not match, further compares the second parameter included in said first relay information with the second parameter included in said second relay information;
a second determining unit that, if said parameter comparing unit determined that said both second parameters match, determines that the first relay information and the second relay information are not duplicates; and
a third determining unit that, if said parameter comparing unit determined that said both second parameters do not match, determines that the first relay information and the second relay information are duplicates.

* * * * *